United States Patent
Yi et al.

(10) Patent No.: US 12,156,186 B2
(45) Date of Patent: Nov. 26, 2024

(54) METHOD AND APPARATUS FOR TRANSMITTING UPLINK CHANNEL IN WIRELESS COMMUNICATION SYSTEM

(71) Applicant: Samsung Electronics Co., Ltd., Suwon-si (KR)

(72) Inventors: Junyung Yi, Suwon-si (KR); Youngbum Kim, Suwon-si (KR); Jeongho Yeo, Suwon-si (KR); Sungjin Park, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 17/696,541

(22) Filed: Mar. 16, 2022

(65) Prior Publication Data
US 2022/0303988 A1 Sep. 22, 2022

(30) Foreign Application Priority Data
Mar. 16, 2021 (KR) .................. 10-2021-0033940

(51) Int. Cl.
*H04W 72/0446* (2023.01)
(52) U.S. Cl.
CPC .................. *H04W 72/0446* (2013.01)
(58) Field of Classification Search
None
See application file for complete search history.

(56) References Cited

U.S. PATENT DOCUMENTS

| | | | |
|---|---|---|---|
| 10,925,087 B2 | 2/2021 | Sun et al. | |
| 2021/0352527 A1* | 11/2021 | Sridharan | ................. H04L 1/08 |
| 2022/0191864 A1* | 6/2022 | Talarico | ................. H04W 72/23 |
| 2022/0256531 A1* | 8/2022 | Sridharan | ................. H04L 1/08 |
| 2022/0287039 A1* | 9/2022 | Sridharan | ............. H04W 72/53 |
| 2023/0232380 A1* | 7/2023 | Bhamri | ..................... H04L 1/08 |
| | | | 370/329 |

FOREIGN PATENT DOCUMENTS

| | | |
|---|---|---|
| EP | 4123954 A1 | 1/2023 |
| WO | 2021245624 A1 | 12/2021 |

OTHER PUBLICATIONS

Nokia, 3GPP TSG RAN WG1 #104-bis-e: FL summary of TB processing over multi-slot PUSCH (AI 8.8.1.2), Apr. 12-20, 2021, pp. 17-18. (Year: 2021).*

International Search Report and Written Opinion of the International Searching Authority dated Jun. 13, 2022, in connection with International Application No. PCT/KR2022/003660, 8 pages.

(Continued)

*Primary Examiner* — Otis L Thompson, Jr.

(57) ABSTRACT

The disclosure relates to a 5G or 6G communication system for supporting a higher data transmission rate. A method performed by a terminal in a wireless communication system comprises determining multiple slots for a PUSCH transmission; identifying a redundancy version for the PUSCH transmission; and transmitting a transport block (TB) across the multiple slots determined for the PUSCH transmission, wherein a single value of the redundancy version is applied on the TB across the multiple slots.

14 Claims, 18 Drawing Sheets

(56) References Cited

OTHER PUBLICATIONS

Oppo, "Supporting TB over multi-slot PUSCH," R1-2100173, 3GPP TSG RAN WG1 #103-e, e-Meeting, Jan. 25-Feb. 5, 2021, 4 pages.
Samsung, "TB processing over multi-slot PUSCH," R1-2101222, 3GPP TSG RAN WG1 #104 e, e-Meeting, Jan. 25-Feb. 5, 2021, 5 pages.
Vivo, "Discussion on PUSCH TB processing over multiple slots," R1-2100458, 3GPP TSG RAN WG1 #104-e, e-Meeting, Jan. 25-Feb. 5, 2021, 7 pages.
ZTE Corporation, "Discussion on TB processing over multi-slot PUSCH," R1-2100096, 3GPP TSG RAN WG1 #104-e, e-Meeting, Jan. 25-Feb. 5, 2021, 4 pages.
3GPP TS 38.214 V17.0.0 (Dec. 2021), Technical Specification, 3rd Generation Partnership Project; Technical Specification Group Radio Access Network; NR; Physical layer procedures for data (Release 17), Dec. 2021, 217 pages.
Supplementary European Search Report dated Jul. 15, 2024, in connection with European Application No. 22771753.5, 13 pages.
Mediatek, Inc., "Discussion on TB processing over multi-slot Pusch," R1-210646, 3GPP TSG RAN WG1 #104e, e-Meeting, Jan. 25-Feb. 5, 2021, 3 pages.

\* cited by examiner

FIG. 3

One symbol pattern

301:
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |

Two symbol pattern

302:
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |

One symbol pattern

303:
| 4/5 | CDM group2 |
| 4/5 | |
| 2/3 | CDM group1 |
| 2/3 | |
| 0/1 | CDM group0 |
| 0/1 | |
| 4/5 | CDM group2 |
| 4/5 | |
| 2/3 | CDM group1 |
| 2/3 | |
| 0/1 | CDM group0 |
| 0/1 | |

Two symbol pattern

304:
| 4/5/10/11 | CDM group2 |
| 4/5/10/11 | |
| 2/3/8/9 | CDM group1 |
| 2/3/8/9 | |
| 0/1/6/7 | CDM group0 |
| 0/1/6/7 | |
| 4/5/10/11 | CDM group2 |
| 4/5/10/11 | |
| 2/3/8/9 | CDM group1 |
| 2/3/8/9 | |
| 0/1/6/7 | CDM group0 |
| 0/1/6/7 | |

FIG. 7
Transport block processing over multi-slot PUSCH(TBoMS):
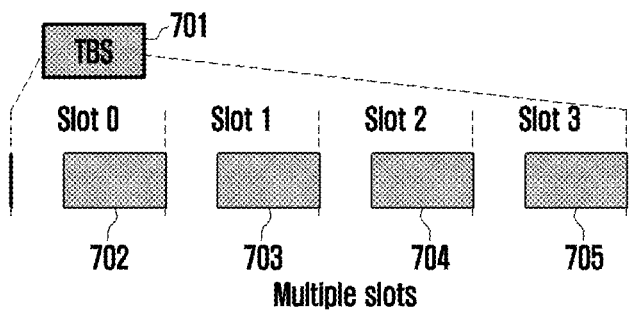
PUSCH repetition type A like TDRA for TBoMS (S=5, L=9, k=4) (706):
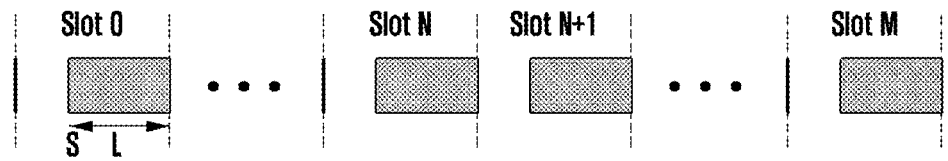
PUSCH repetition type B like TDRA with long symbol L for TBoMS (707):
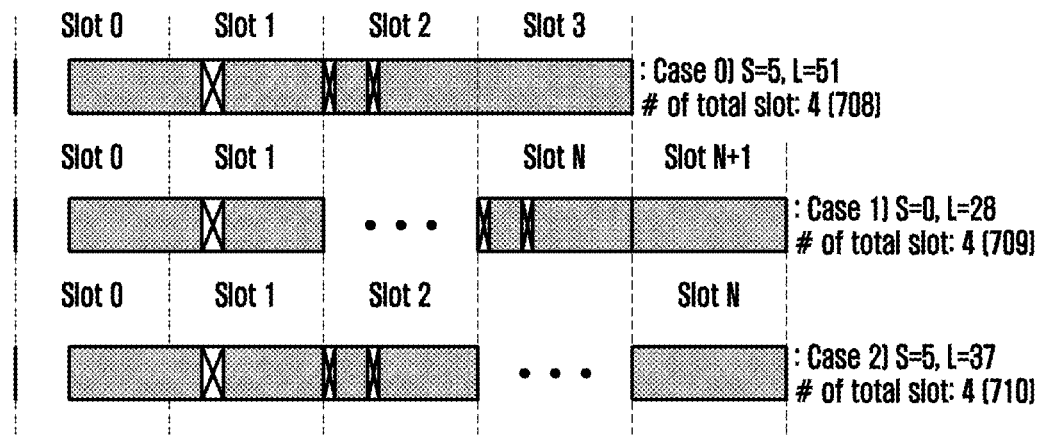

FIG. 10
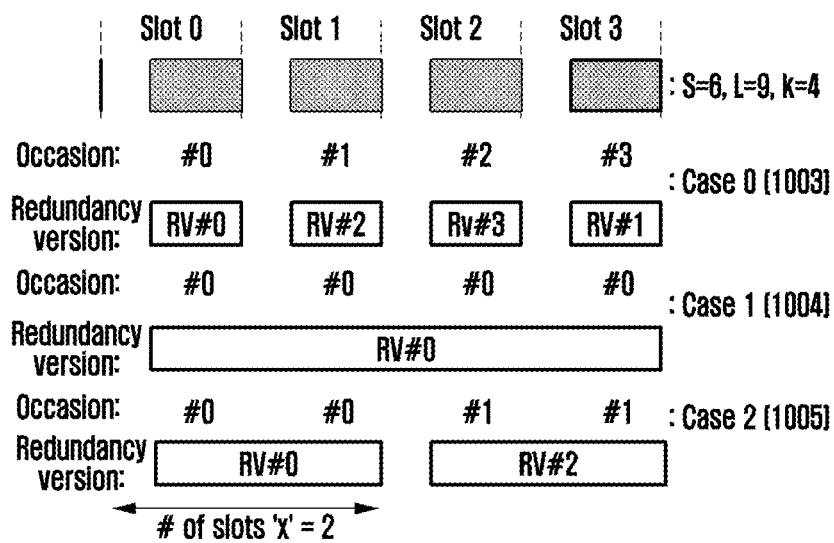
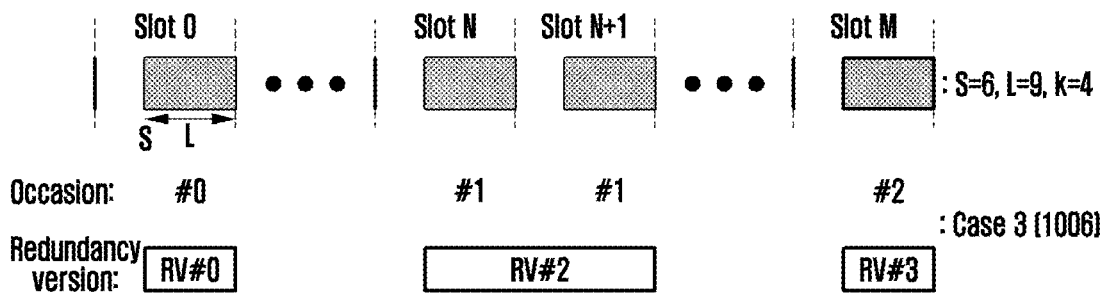

FIG. 11
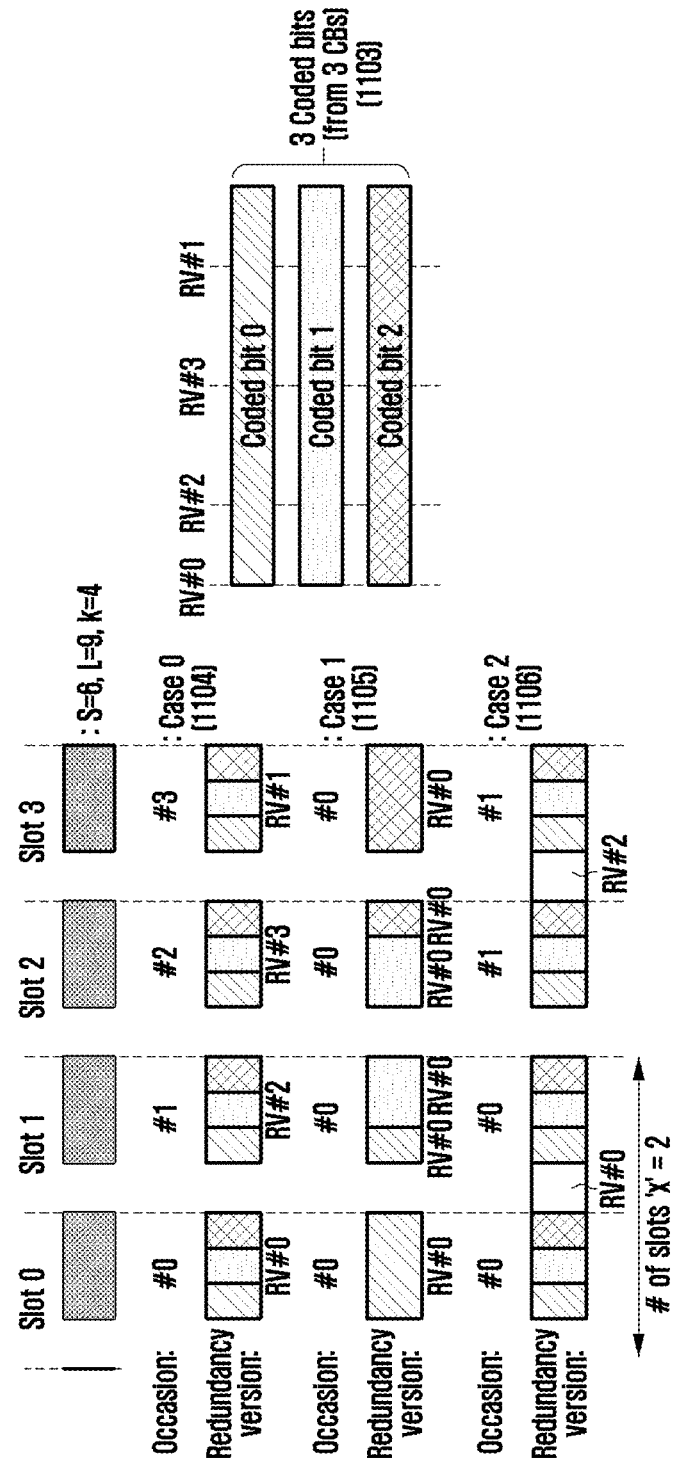
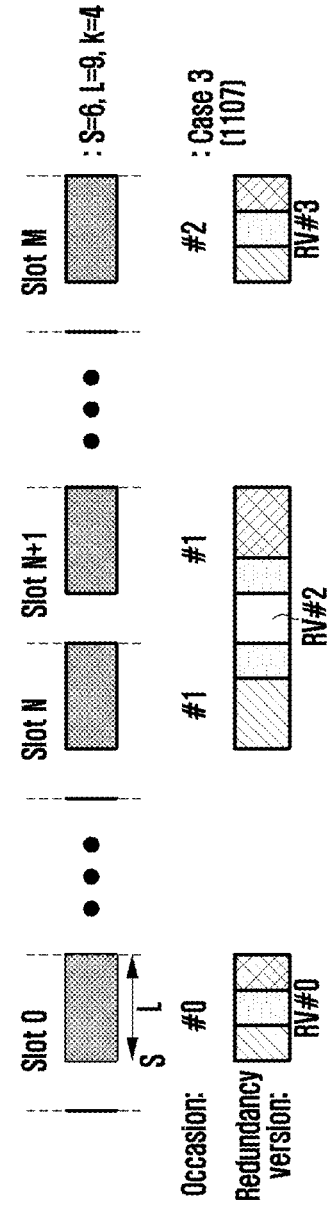

METHOD AND APPARATUS FOR TRANSMITTING UPLINK CHANNEL IN WIRELESS COMMUNICATION SYSTEM

CROSS-REFERENCE TO RELATED APPLICATIONS

This application is based on and claims priority under 35 U.S.C. § 119 to Korean Patent Application No. 10-2021-0033940, filed on Mar. 16, 2021, in the Korean Intellectual Property Office, the disclosure of which is herein incorporated by reference in its entirety.

BACKGROUND

1. Field

The disclosure relates to a method and an apparatus for transmitting or receiving an uplink channel by a base station or a terminal in a wireless communication system.

2. Description of Related Art $5^{th}$ generation (5G) mobile communication technologies define broad frequency bands such that high transmission rates and new services are possible, and can be implemented not only in "sub 6 GHz" bands such as 3.5 GHz, but also in "above 6 GHz" bands referred to as mmWave including 28 GHz and 39 GHz. In addition, it has been considered to implement 6G mobile communication technologies (referred to as beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broad band (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing may be connected to communication networks, and it is accordingly expected that enhanced functions and performances of 5G mobile communication systems and integrated operations of connected devices may be necessary. To this end, new research is scheduled in connection with eXtended Reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems may serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

With the recent development of 5G communication systems, the need for a method of repeatedly transmitting uplink to extend cell coverage in an ultra-high frequency (mmWave) band is emerging.

SUMMARY

The disclosure provides a method and apparatus for transmitting a physical uplink shared channel (PUSCH) in multiple slots for improving the coverage of an uplink channel in a wireless communication system.

The present disclosure for solving the above problems provides a method performed by a terminal in a wireless communication system. The method comprises determining multiple slots for a PUSCH transmission; identifying a redundancy version for the PUSCH transmission; and transmitting a transport block (TB) across the multiple slots determined for the PUSCH transmission, wherein a single value of the redundancy version is applied on the TB across the multiple slots.

Further, a method performed by a base station in a wireless communication system, according to an embodiment of the present disclosure, comprises transmitting, to a terminal, information on multiple slots for a PUSCH transmission; and receiving, from the terminal, a transport block (TB) across the multiple slots for the PUSCH transmission, wherein a single value of a redundancy version for the PUSCH transmission is applied on the TB across the multiple slots.

Further, a terminal in a wireless communication system, according to an embodiment of the present disclosure, comprises a transceiver configured to transmit and receive signals; and a processor coupled with the transceiver. In addition, the processor is configured to determine multiple slots for a PUSCH transmission, identify a redundancy version for the PUSCH transmission; and transmit a transport block (TB) across the multiple slots determined for the PUSCH transmission, wherein a single value of the redundancy version is applied on the TB across the multiple slots.

Further, a terminal in a wireless communication system, according to an embodiment of the present disclosure, comprises a transceiver configured to transmit and receive signals; and a processor coupled with the transceiver. In addition, the processor is configured to transmit, to a terminal, information on multiple slots for a PUSCH transmission; and receive, from the terminal, a transport block (TB) across the multiple slots for the PUSCH transmission, wherein a single value of a redundancy version for the PUSCH transmission is applied on the TB across the multiple slots.

According to an embodiment of the disclosure, a transport block size (TBS) having a low code rate can be determined for uplink transmission in which one transport block (TB) is mapped to multiple slots.

Further, according to an embodiment of the disclosure, a method for mapping a transmission occasion and redundancy version (RV) can be determined for uplink transmission in which one transport block (TB) is mapped to multiple slots.

Further, according to an embodiment of the disclosure, it is possible to obtain a channel coding gain and improve the coverage of an uplink channel.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram illustrating a DMRS pattern (type 1 and type 2) used for communication between a base station and a terminal in a 5G system;

FIG. 7 is a diagram illustrating an example of multi-slot PUSCH transmission (TBoMS) composed of one TB in the 5G system according to embodiments of the present disclosure;

FIG. 10 is a diagram illustrating an example of PUSCH occasion and redundancy version mapping in a multi-slot PUSCH transmission (TBoMS) composed of a single code block and one TB allocated with time domain resources like PUSCH repetition type A according to embodiments of the present disclosure;

FIG. 11 is a diagram illustrating an example of PUSCH occasion and redundancy version mapping in a multi-slot PUSCH transmission (TBoMS) composed of multi-code blocks and one TB allocated with time domain resources like PUSCH repetition type A according to embodiments of the present disclosure;

DETAILED DESCRIPTION

Figure 1:
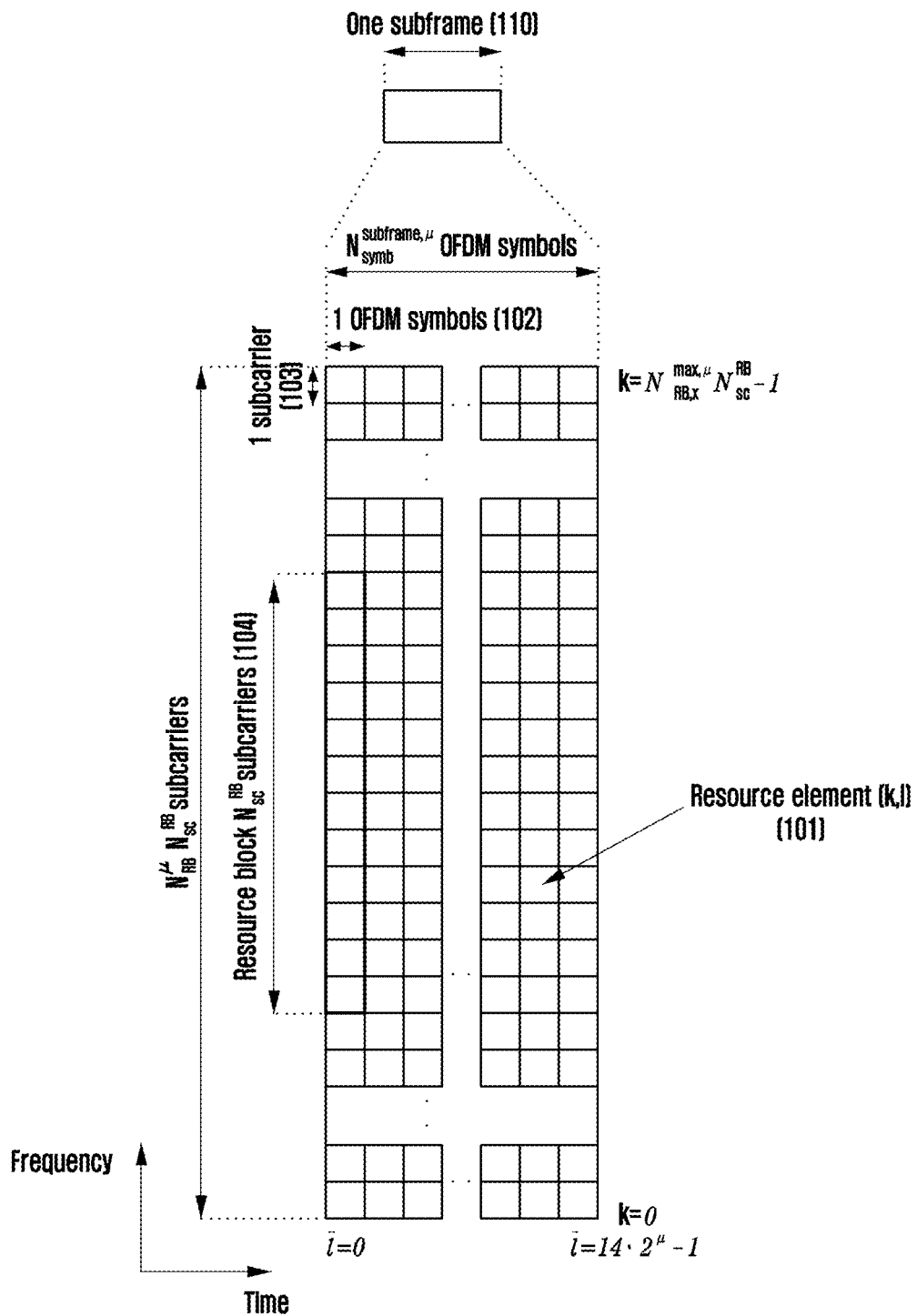
FIG. 1 is a diagram illustrating a basic structure of a time-frequency domain that is a wireless resource region in which data or a control channel is transmitted in a 5G system.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. In describing embodiments of the disclosure below, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink" refers to a radio link via which a base station transmits a signal to a terminal, and an "uplink" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include $5^{th}$ generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

Hereinafter, embodiments of the disclosure will be described in detail with reference to the accompanying drawings. Hereinafter, a method and an apparatus provided in embodiments of the disclosure describe the embodiments of the disclosure as an example for improvement of a PUSCH coverage, but are not applied limitedly to each example. It may also be possible to use a combination of all or some of one or more embodiments provided in the disclosure, in a frequency resource configuration method corresponding to a different channel. Therefore, embodiments of the disclosure may be applied through partial modification without departing from the scope of the disclosure through determination by a person skilled in the art.

Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Wireless communication systems have developed into broadband wireless communication systems that provide a high speed and high quality packet data service including communication standards, such as high speed packet access (HSPA), long-term evolution (LTE or evolved universal terrestrial radio access (E-UTRA)), LTE-advanced (LTE-A), and LTE-Pro related to 3GPP, high rate packet data (HRPD) and ultra-mobile broadband (UMB) related to 3GPP2, IEEE 802.16e, and the like, beyond voice-based service provided at the initial stage.

An LTE system, which is a representative example of a broadband wireless communication system, employs an orthogonal frequency division multiplexing (OFDM) scheme for a downlink (DL), and employs a single carrier frequency division multiple access (SC-FDMA) scheme for an uplink (UL). Uplink denotes a wireless link for transmitting data or a control signal by a terminal (user equipment (UE) or mobile station (MS)) to a base station (BS or eNode B (eNB)) and downlink denotes a wireless link for transmitting data or a control signal by a base station to a terminal. In a multiple access scheme described above, generally, time-frequency resources for carrying data or control information are allocated and managed in a manner to prevent overlapping of the resources between users, that is, to establish orthogonality so as to distinguish data or control information of each user.

A 5G communication system, which is a post-LTE communication system, is required to support a service satisfying various requirements so as to freely reflect various requirements from a user and a service provider. Enhanced mobile broadband (eMBB), massive machine type communication (mMTC), ultra-reliable low-latency communication (URLLC), etc. may be considered as a service for a 5G communication system.

The purpose of eMBB is to provide a more improved data rate than that supported by the conventional LTE, LTE-A, or LTE-Pro. For example, in a 5G communication system, eMBB is required to provide a peak data rate of 10 Gbps for uplink and a peak data rate of 20 Gbps for downlink in view of a single base station. Furthermore, a 5G communication system is required to provide both a peak data rate and an increased user-perceived data rate of a terminal. In order to meet these requirements described above, the improvement of various transmission/reception technologies including a further enhanced multiple antenna (multi-input multi-output (MIMO)) transmission technology may be required. In addition, while, in an LTE system, a signal is transmitted using a maximum 20 MHz transmission bandwidth within a 2 GHz band, in a 5G communication system, a frequency bandwidth wider than 20 MHz is used within a frequency band of 3-6 GHz or a frequency band of 6 GHz or higher, so that a data transfer rate required for a 5G communication system can be satisfied.

Meanwhile, mMTC has been considered to support an application service, such as the Internet of Things (IoT), in a 5G communication system. mMTC requires the support of massive terminal access in a cell, the improvement of terminal coverage, improved battery lifetime, terminal cost reduction, etc. in order to efficiently provide the Internet of Things. Since the Internet of Things is mounted in various sensors and devices to provide a communication function, mMTC is required to support a large number of terminals (e.g., 1,000,000 terminals/km2) in a cell. In addition, a terminal supporting mMTC requires a wider coverage compared to other services provided in a 5G communication system because it is highly probable that the terminal is located in a radio shadow area, such as the basement of a building, which a cell fails to cover, due to the nature of the service. A terminal supporting mMTC is required to be inexpensive and to have a very long battery lifetime of, for example, 10-15 years, because it is difficult to often change the battery of the terminal.

Lastly, URLLC is a cellular-based wireless communication service which is used for a particular purpose (mission-critical). For example, a service used in remote control of robots or machinery, industrial automation, unmanned aerial vehicles, remote health care, emergency alerts, etc. may be considered therefor. Therefore, communication provided by URLLC is required to provide very low latency and very high reliability. For example, a service supporting URLLC may be required to satisfy both requirements including a wireless access latency time (air interface latency) shorter than 0.5 milliseconds and a packet error rate of 10-5 or lower. Therefore, for a service supporting URLLC, a 5G system is required to provide a transmission time interval (TTI) shorter than those of other services, and allocate a wide domain of resources in a frequency band to secure the reliability of a communication link.

The three services of a 5G communication system (hereinafter, this can be used together with a 5G system), that is, eMBB, URLLC, and mMTC, may be multiplexed and then transmitted in a single system. In order to satisfy different requirements of the services, different transmission/reception techniques and different transmission/reception parameters may be used for the services, respectively.

Hereinafter, a frame structure of a 5G system will be described in detail with reference to the drawings.

FIG. 1 is a diagram illustrating a basic structure of a time-frequency domain that is a wireless resource region of a 5G system.

In FIG. 1, the transverse axis indicates a time domain, and the longitudinal axis indicates a frequency domain. A basic unit of the resources in the time-frequency domain is a resource element (RE) 101, and may be defined by one orthogonal frequency division multiplexing (OFDM) symbol 102 (or a discrete Fourier transform spread OFDM (DFT-s-OFDM) symbol) in the time axis and one subcarrier 103 in the frequency axis. In the frequency domain, $N_{sc}^{RE}$ number (e.g., 12) of consecutive REs may configure one resource block (RB) 104. In addition, in the time domain, $N_{symb}^{subframe}$ number of consecutive OFDM symbols may configure one subframe 110.

Figure 2:
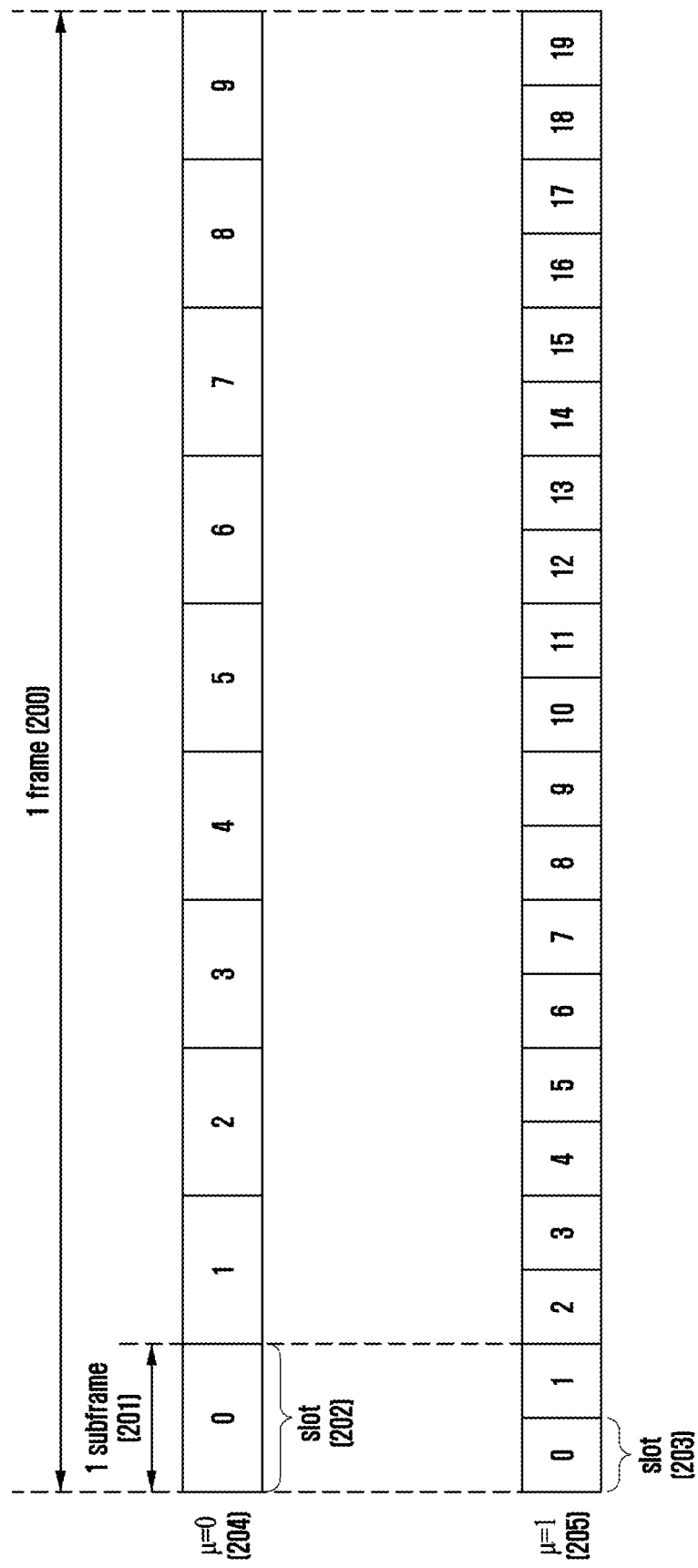
FIG. 2 is a diagram illustrating a slot structure considered in a 5G system.

FIG. 2 is a diagram illustrating a slot structure considered in a 5G system.

In FIG. 2, an example of a structure of a frame 200, a subframe 201, and a slot 202 is illustrated. The one frame 200 may be defined as 10 ms. The one subframe 201 may be defined as 1 ms, and thus the one frame 200 may be configured by a total of 10 subframes 201. Furthermore, the one slot 202 or 203 may be defined as 14 OFDM symbols (i.e., the number ($N_{symb}^{slot}$) of symbols per one slot=14). The one subframe 201 may be configured by the one slot 202 or multiple slots 203, and the number of slots 202 or 203 per one subframe 201 may vary according to a configuration value μ 204 or 205 of subcarrier spacing.

In the example of FIG. 2, respective slot structures of a case of μ=0 (204) and a case of μ=1 (205) are illustrated as a subcarrier spacing configuration value. In the case of μ=0 (204), the one subframe 201 may be configured by the one slot 202, and in the case of μ=1 (205), the one subframe 201 may be configured by two slots 203. That is, the number ($N_{slot}^{subframe,\mu}$) of slots per one subframe may vary according to a configuration value μ of a subcarrier spacing, and the number ($N_{slot}^{frame,\mu}$) of slots per one frame may vary accordingly. $N_{slot}^{subframe,\mu}$ and $N_{slot}^{frame,\mu}$ according to each subcarrier spacing configuration μ may be defined as shown below in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |

TABLE 1-continued

| μ | $N_{symb}^{slot}$ | $N_{slot}^{frame,\mu}$ | $N_{slot}^{subframe,\mu}$ |
|---|---|---|---|
| 4 | 14 | 160 | 16 |
| 5 | 14 | 320 | 32 |

Next, a demodulation reference signal (DMRS) that is one of reference signals in a 5G system will be described in detail.

A DMRS may be configured by several DMRS ports, and each port uses code division multiplexing (CDM) or frequency division multiplexing (FDM) to maintain orthogonality so as not to generate mutual interference. However, terms for DMRSs may be expressed by different terms according to a user's intent and the purpose of using reference signals. More specifically, the term of DMRSs merely corresponds to a particular example so as to easily describe technical contents of the disclosure and help the understanding of the disclosure and is not intended to limit the scope of the disclosure. That is, it is obvious to those skilled in the art to which the disclosure belongs, that the disclosure can be also carried out for reference signals based on the technical spirit of the disclosure.

FIG. 3 is a diagram illustrating a DMRS pattern (type 1 and type 2) used for communication between a base station and a terminal in a 5G system.

Two DMRS pattern may be supported in a 5G system. The two DMRS patterns are illustrated in detail in FIG. 3. Referring to FIG. 3, reference numerals 301 and 302 indicate DMRS type 1, reference numeral 301 indicates a 1 symbol pattern, and reference numeral 302 indicates a 2 symbol pattern. DMRS type 1 indicated by reference numerals 301 and 302 in FIG. 3 corresponds to a comb 2 structure DMRS pattern, and may be configured by two CDM groups, and different CDM groups may be FDMed.

In the 1 symbol pattern indicated by reference numeral 301 in FIG. 3, frequency domain CDM may be applied to the same CDM groups to distinguish between two DMRS ports, and thus a total of four orthogonal DMRS ports may be configured. DMRS port IDs mapped to CDM groups are illustrated in the pattern indicated by reference numeral 301 in FIG. 3 (in a case of downlink, DMRS port IDs are shown by adding +1000 to the illustrated numbers). In the 2 symbol pattern indicated by reference numeral 302 in FIG. 3, time/frequency domain CDM may be applied to the same CDM groups to distinguish between four DMRS ports, and thus a total of eight orthogonal DMRS ports may be configured. DMRS port IDs mapped to CDM groups are illustrated in the pattern indicated by reference numeral 302 in FIG. 3 (in a case of downlink, DMRS port IDs are shown by adding +1000 to the illustrated numbers).

DMRS type 2 indicated by reference numerals 303 and 304 in FIG. 3 corresponds to a DMRS pattern having a structure in which frequency domain orthogonal cover codes (FD-OCC) are applied to subcarriers adjacent on frequency, and may be configured by three CDM groups, and different CDM groups may be FDMed.

In the 1 symbol pattern indicated by reference numeral 303 in FIG. 3, frequency domain CDM may be applied to the same CDM groups to distinguish between two DMRS ports, and thus a total of six orthogonal DMRS ports may be configured. DMRS port IDs mapped to CDM groups are illustrated in the pattern indicated by reference numeral 303 in FIG. 3 (in a case of downlink, DMRS port IDs are shown by adding +1000 to the illustrated numbers). In the 2 symbol pattern indicated by reference numeral 304 in FIG. 3, time/frequency domain CDM may be applied to the same CDM groups to distinguish between four DMRS ports, and thus a total of 12 orthogonal DMRS ports may be configured. DMRS port IDs mapped to CDM groups are illustrated in the pattern indicated by reference numeral 304 in FIG. 3 (in a case of downlink, DMRS port IDs are shown by adding +1000 to the illustrated numbers).

As described above, in an NR system, two different DMRS patterns (the patterns indicated by reference numerals 301 and 302 or the patterns indicated by reference numerals 303 and 304 in FIG. 3) may be configured, and whether the DMRS pattern is the one symbol pattern 301 or 303, or the two adjacent symbol patterns 302 or 304 may be also configured. Moreover, in an NR system, DMRS port numbers are scheduled, and in addition, the number of CDM groups scheduled together for PDSCH rate matching may be configured and signaled. In addition, in a case of cyclic prefix based orthogonal frequency division multiplexing (CP-OFDM), both of the two DMRS patterns described above may be supported in downlink (DL) and uplink (UL), and in a case of discrete Fourier transform spread OFDM (DFT-S-OFDM), only DMRS type 1 among the above DMRS patterns may be supported in UL.

Furthermore, an additional DMRS may be supported to be configurable. A front-loaded DMRS indicates the first DMRS appearing in the most front symbol in time, and an additional DMRS indicates a DMRS appearing in a symbol after the front-loaded DMRS. In an NR system, the number of additional DMRSs may be configured to be a minimum of 0 to a maximum of 3. In addition, in a case where an additional DMRS is configured, the same pattern as a front-loaded DMRS may be assumed. More specifically, when information relating to whether the described DMRS pattern type is type 1 or type 2, information relating to whether the DMRS pattern is a one symbol pattern or a two adjacent symbol pattern, and information on a DMRS port and the number of CDM groups used therewith are indicated for a front-loaded DMRS, in a case where an additional DMRS is additionally configured, it may be assumed that the same DMRS information as the front-loaded DMRS is configured for the additional DMRS.

More specifically, a downlink DMRS configuration described above may be configured through RRC signaling as shown in Table 2 below.

TABLE 2

```
DMRS-DownlinkConfig ::=                    SEQUENCE {
    dmrs-Type (DMRS type configuration)             ENUMERATED {type2}
OPTIONAL, -- Need S
    dmrs-AdditionalPosition (Additional DMRS OFDM symbol configuration)
ENUMERATED {pos0, pos1, pos3}              OPTIONAL, -- Need S
    maxLength (1 symbol or 2symbol DMRS pattern-related configuration)
ENUMERATED {len2} OPTIONAL, -- Need S
        scramblingID0 (Scrambling ID0)             INTEGER (0..65535)
        OPTIONAL, -- Need S
        scramblingID1 (Scrambling ID1)             INTEGER (0..65535)
OPTIONAL, -- Need S
        phaseTrackingRS (PTRS configuration)       SetupRelease { PTRS-
DownlinkConfig } OPTIONAL, -- Need M
    ...
}
```

In addition, an uplink DMRS configuration described above may be configured through RRC signaling as shown in Table 3 below.

TABLE 3

```
DMRS-UplinkConfig ::=                      SEQUENCE {
    dmrs-Type (DMRS type configuration)             ENUMERATED {type2}
OPTIONAL, -- Need S
    dmrs-AdditionalPosition (Additional DMRS OFDM symbol configuration)
ENUMERATED {pos0, pos1, pos3}              OPTIONAL, -- Need
R
    phaseTrackingRS (PTRS configuration)           SetupRelease { PTRS-
UplinkConfig }                             OPTIONAL, -- Need M
    maxLength (1 symbol or 2symbol DMRS pattern-related configuration)
ENUMERATED {len2}                          OPTIONAL, -- Need S
    transformPrecodingDisabled             SEQUENCE {
        scramblingID0 (Scrambling ID0)             INTEGER (0..65535)
OPTIONAL, -- Need S
        scramblingID1 (Scrambling ID1)             INTEGER (0..65535)
OPTIONAL, -- Need S
        ...
    }                                      OPTIONAL, -- Need R
    transformPrecodingEnabled              SEQUENCE {
        nPUSCH-Identity (Cell ID for DFT-s-OFDM)   INTEGER(0..1007)
OPTIONAL, -- Need S
        sequenceGroupHopping (Sequence group hopping)   ENUMERATED
```

TABLE 3-continued

| | |
|---|---|
| {disabled} OPTIONAL, -- Need S | |
| sequenceHopping (Sequence hopping) OPTIONAL, -- Need S | ENUMERATED {enabled} |
| ... | |
| } | OPTIONAL, -- Need R |
| ... | |
| } | |

Figure 4:
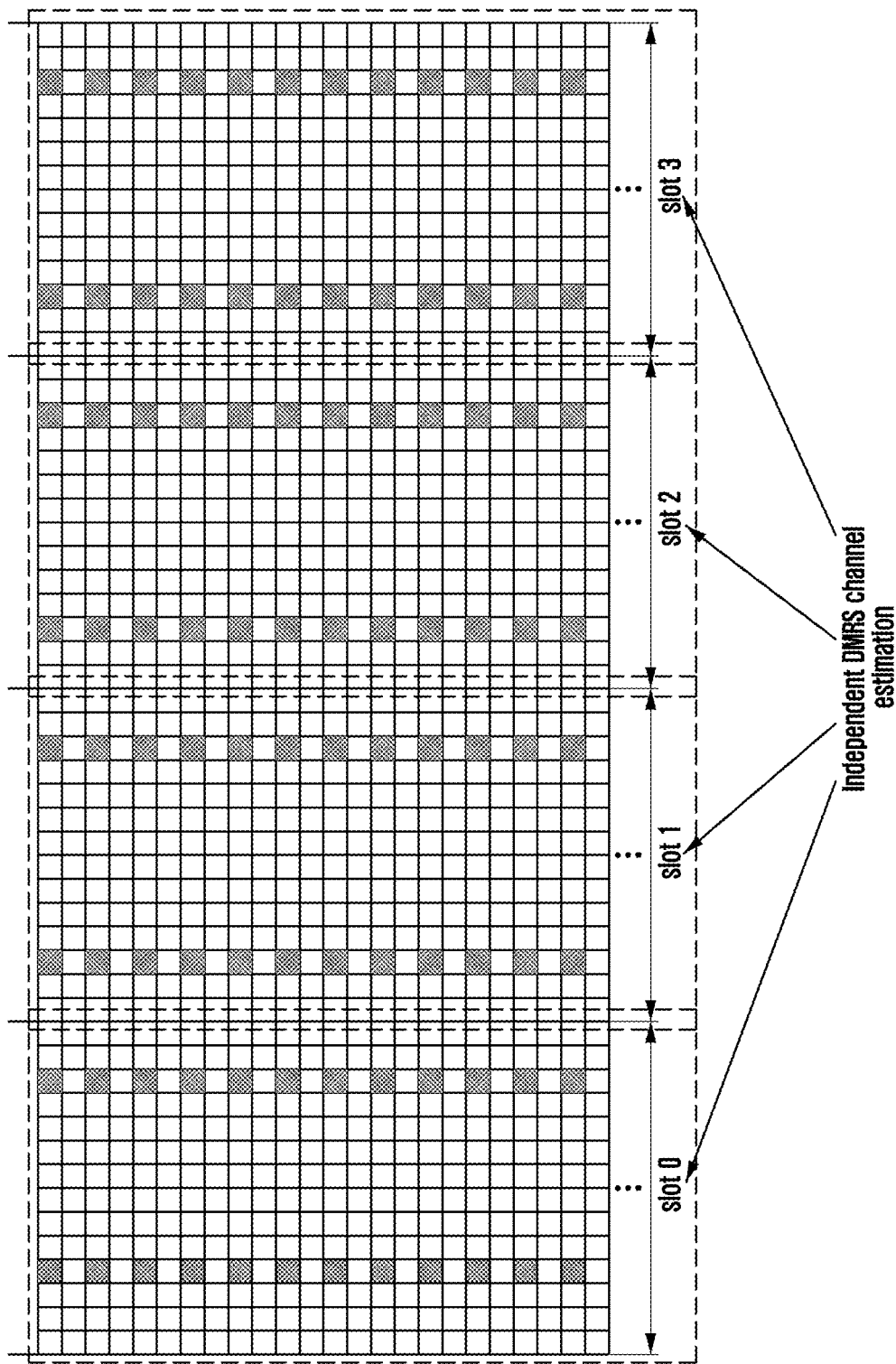
FIG. 4 is a diagram illustrating an example of channel estimation using a DMRS received in one PUSCH in a time band in a 5G system.

FIG. 4 is a diagram illustrating an example of channel estimation using a DMRS received in one PUSCH in a time band in a 5G system.

When a channel estimation for data decoding is performed using a DMRS described above, the channel estimation may be performed within a precoding resource block group (PRG), which is a corresponding bundling unit, by using PRB bundling associated with a system band in a frequency band. In addition, in a time unit, a channel is estimated under an assumption that precoding is the same only for a DMRS received in only one PUSCH.

Hereinafter, a method for allocating time domain resources to a data channel in a 5G communication system will be described. A base station may configure, for a terminal, a table relating to time domain resource allocation information for a downlink data channel (physical downlink shared channel, PDSCH) and an uplink data channel (physical uplink shared channel, PUSCH) through higher layer signaling (e.g., RRC signaling).

The base station may configure, for a PDSCH, a table configured by a maximum of 17 entries (maxNrofDL-Allocations=17), and may configure, for a PUSCH, a table configured by a maximum of 17 entries (maxNrofUL-Allocations=17). Time domain resource allocation information may include, for example, PDCCH-to-PDSCH slot timing (a time interval expressed in the units of slots, between a time point at which a PDCCH is received, and a time point at which a PDSCH scheduled by the received PDCCH is transmitted, the timing is indicated by K0) or PDCCH-to-PUSCH slot timing (i.e., a time interval expressed in the units of slots, between a time point at which a PDCCH is received, and a time point at which a PUSCH scheduled by the received PDCCH is transmitted, the timing is indicated by K2), information relating to the starting symbol position and the length of a PDSCH or a PUSCH scheduled in a slot, a mapping type of a PDSCH or a PUSCH, and the like. For example, time domain resource allocation information for a PDSCH may be configured for the terminal through an RRC signal as shown in Table 4 below.

TABLE 4

| PDSCH-TimeDomainResourceAllocationList information element |
|---|
| PDSCH-TimeDomainResourceAllocationList ::= SEQUENCE (SIZE(1..maxNrofDL-Allocations)) OF PDSCH-TimeDomainResourceAllocation<br>PDSCH-TimeDomainResourceAllocation ::= SEQUENCE {<br>  k0    INTEGER(0..32) OPTIONAL, -- Need S<br>    (PDCCH-to-PDSCH timing, slot unit)<br>  mappingType    ENUMERATED {typeA, typeB},<br>    (PDSCH mapping type)<br>  startSymbolAndLength    INTEGER (0..127)<br>    (PDSCH starting symbol and length)<br>} |

In addition, for example, time domain resource allocation information for a PUSCH may be configured for the terminal through an RRC signal as shown in Table 5 below.

TABLE 5

| PUSCH-TimeDomainResourceAllocation information element |
|---|
| PUSCH-TimeDomainResourceAllocationList: := SEQUENCE (SIZE(1..maxNrofUL-Allocations)) OF PUSCH-TimeDomainResourceAllocation<br>PUSCH-TimeDomainResourceAllocation ::= SEQUENCE{<br>  k2    INTEGER(0..32)    OPTIONAL, -- Need S<br>    (PDCCH-to-PUSCH timing, slot unit)<br>  mappingType    ENUMERATED {typeA, typeB},<br>    (PUSCH mapping type)<br>  startSymbolAndLength    INTEGER (0..127)<br>    (PUSCH starting symbol and length)<br>} |

The base station may transmit, to the terminal, one of the entries of a table relating to the time domain resource allocation information through L1 signaling (e.g., downlink control information (DCI)) (e.g., the base station may indicate same through a "time domain resource allocation" field in DCI). The terminal may obtain time domain resource allocation information relating to a PDSCH or PUSCH, based on DCI received from the base station.

Hereinafter, transmission of an uplink data channel (a physical uplink shared channel (PUSCH)) in a 5G system will be described in detail. PUSCH transmission may be dynamically scheduled by a UL grant in DCI, or may be operated by configured grant Type 1 or configured grant Type 2. Dynamic scheduling for PUSCH transmission may be indicated by, for example, DCI format 0_0 or DCI format 0_1.

Configured grant Type 1 PUSCH transmission may be semi-statically configured through reception of configuredGrantConfig including rrc-ConfiguredUplinkGrant shown in [Table 6] through higher signaling without reception of a UL grant in DCI. Configured grant Type 2 PUSCH transmission may be semi-persistently scheduled by an UL grant in DCI after reception of configuredGrantConfig not including rrc-ConfiguredUplinkGrant shown in [Table 6] through higher signaling. In a case where a PUSCH transmission is operated by a configured grant, parameters applied to the PUSCH transmission may be applied through configuredGrantConfig, which is higher signaling of [Table 6], except for particular parameters (e.g., dataScramblingIdentityPUSCH, txConfig, codebookSubset, maxRank, and scaling of UCI-OnPUSCH) provided by pusch-Config shown in [Table 7], which is higher signaling. For example, when transformPrecoder in configuredGrantConfig, which is higher signaling of [Table 6], is provided to the terminal, the terminal may apply tp-pi2BPSK in pusch-Config of [Table 7] to PUSCH transmission operated by a configured grant.

TABLE 6

| ConfiguredGrantConfig |
|---|
| ConfiguredGrantConfig ::=    SEQUENCE { |
|     frequencyHopping                    ENUMERATED {intraSlot, interSlot} |
| OPTIONAL, -- Need S, |
|     cg-DMRS-Configuration            DMRS-UplinkConfig, |
|     mcs-Table                                ENUMERATED {qam256, qam64LowSE} |
| OPTIONAL, -- Need S |
|     mcs-TableTransformPrecoder    ENUMERATED {qam256, qam64LowSE} |
| OPTIONAL, -- Need S |
|     uci-OnPUSCH                            SetupRelease { CG-UCI-OnPUSCH } |
| OPTIONAL, -- Need M |
|     resourceAllocation                    ENUMERATED { resourceAllocationType0, resourceAllocationType1, dynamicSwitch }, |
|     rbg-Size                                    ENUMERATED {config2} |
| OPTIONAL, -- Need S |
|     powerControlLoopToUse        ENUMERATED {n0, n1}, |
|     p0-PUSCH-Alpha                    P0-PUSCH-AlphaSetId, |
|     transformPrecoder                  ENUMERATED {enabled, disabled} |
| OPTIONAL, -- Need S |
|     nrofHARQ-Processes            INTEGER(1..17), |
|     repK            ENUMERATED {n1, n2, n4, n8}, |
|     repK-RV                                  ENUMERATED {s1-0231, s2-0303, s3-0000} |
| OPTIONAL, -- Need R |
|     periodicity            ENUMERATED { |
|                 sym2, sym7, sym1x14, sym2x14, sym4x14, sym5x14, sym8x14, sym10x14, sym17x14, sym20x14, |
|                 sym32x14, sym40x14, sym64x14, sym80x14, sym128x14, sym170x14, sym256x14, sym320x14, sym512x14, |
|                 sym640x14, sym1024x14, sym1280x14, sym2560x14, sym5120x14, |
|                 sym6, sym1x12, sym2x12, sym4x12, sym5x12, sym8x12, sym10x12, sym17x12, sym20x12, sym32x12, |
|                 sym40x12, sym64x12, sym80x12, sym128x12, sym170x12, sym256x12, sym320x12, sym512x12, sym640x12, |
|                 sym1280x12, sym2560x12 |
|     }, |
|     configuredGrantTimer                                                INTEGER (1..64) |
| OPTIONAL, -- Need R |
|     rrc-ConfiguredUplinkGrant        SEQUENCE { |
|         timeDomainOffset                  INTEGER (0..5119), |
|         timeDomainAllocation            INTEGER (0..16), |
|         frequencyDomainAllocation   BIT STRING (SIZE(18)), |
|         antennaPort                            INTEGER (0..31), |
|         dmrs-SeqInitialization                                              INTEGER (0..1) |
| OPTIONAL, -- Need R |
|         precodingAndNumberOfLayers    INTEGER (0..63), |
|         srs-ResourceIndicator                                              INTEGER (0..16) |
| OPTIONAL, -- Need R |
|         mcsAndTBS                              INTEGER (0..31), |
|         frequencyHoppingOffset        INTEGER (1..maxNrofPhysicalResourceBlocks-1) |
| OPTIONAL, -- Need R |
|         pathlossReferenceIndex                                          INTEGER (0..maxNrofPUSCH-PathlossReferenceRSs-1), |
|         ... |
|     } |
| }                                                                                                OPTIONAL, -- |

TABLE 6-continued

| ConfiguredGrantConfig |
|---|
| Need R<br>...<br>} |

Next, a PUSCH transmission method is described. A DMRS antenna port for PUSCH transmission may be the same as an antenna port for sounding reference signal (SRS) transmission. PUSCH transmission may follow each of a codebook-based transmission method and a non-codebook-based transmission method according to whether the value of txConfig in pusch-Config of [Table 7], which is higher signaling, is a "codebook" or a "nonCodebook." As described above, PUSCH transmission may be dynamically scheduled through DCI format 0_0 or DCI format 0_1, and may be semi-statically configured by a configured grant.

If scheduling for a PUSCH transmission is indicated to the terminal through DCI format 0_0, the terminal may perform beam configuration for the PUSCH transmission by using pucch-spatialRelationInfoID corresponding to a UE-specific (dedicated) PUCCH resource having the lowest ID in an uplink bandwidth part (BWP) activated in a serving cell. The PUSCH transmission may be performed based on a single antenna port. The terminal may not expect, through DCI format 0_0, scheduling for PUCCH transmission within a BWP in which a PUCCH resource including pucch-spatialRelationInfo is not configured. If txConfig in pusch-Config of [Table 7] is not configured for the terminal, the terminal may not expect to be scheduled through DCI format 0_1.

TABLE 7

| PUSCH-Config |
|---|
| PUSCH-Config ::=                SEQUENCE {<br>   dataScramblingIdentityPUSCH    INTEGER (0..1023)              OPTIONAL, -- Need S<br>   txConfig                      ENUMERATED {codebook, nonCodebook} OPTIONAL, -- Need S<br>   dmrs-UplinkForPUSCH-MappingTypeA   SetupRelease { DMRS-UplinkConfig } OPTIONAL, -- Need M<br>   dmrs-UplinkForPUSCH-MappingTypeB   SetupRelease { DMRS-UplinkConfig } OPTIONAL, -- Need M<br>   pusch-PowerControl            PUSCH-PowerControl              OPTIONAL, -- Need M<br>   frequencyHopping              ENUMERATED {intraSlot, interSlot} OPTIONAL, -- Need S<br>   frequencyHoppingOffsetLists SEQUENCE (SIZE (1..4)) OF INTEGER (1..maxNrofPhysicalResourceBlocks−1)  OPTIONAL, -- Need M<br>   resourceAllocation            ENUMERATED { resourceAllocationType0, resourceAllocationType1, dynamicSwitch},<br>   pusch-TimeDomainAllocationList    SetupRelease { PUSCH-TimeDomainResourceAllocationList } OPTIONAL, -- Need M<br>   pusch-AggregationFactor ENUMERATED { n2, n4, n8 }   OPTIONAL, -- Need S<br>   mcs-Table              ENUMERATED {qam256, qam64LowSE}    OPTIONAL, -- Need S<br>   mcs-TableTransformPrecoder     ENUMERATED {qam256, qam64LowSE} OPTIONAL, -- Need S<br>   transformPrecoder             ENUMERATED {enabled, disabled} OPTIONAL, -- Need S<br>   codebookSubset                ENUMERATED      {fullyAndPartialAndNonCoherent, partialAndNonCoherent,nonCoherent}<br>                      OPTIONAL, -- Cond codebookBased<br>   maxRank                    INTEGER (1..4) OPTIONAL, -- Cond codebookBased<br>   rbg-Size                   ENUMERATED { config2}     OPTIONAL, -- Need S<br>   uci-OnPUSCH                   SetupRelease { UCI-OnPUSCH}    OPTIONAL, -- Need M<br>   tp-pi2BPSK                   ENUMERATED {enabled}    OPTIONAL, -- Need S<br>   ...<br>} |

Next, codebook-based PUSCH transmission is described. As described above, codebook-based PUSCH transmission may be dynamically scheduled through DCI format 0_0 or DCI format 0_1, and may be semi-statically operated by a configured grant. If a codebook-based PUSCH transmission is dynamically scheduled by DCI format 0_1, or is semi-statically operated by a configured grant, the terminal may determine a precoder for the PUSCH transmission, based on an SRS resource indicator (SRI), a transmission precoding matrix indicator (TPMI), and a transmission rank (the number of PUSCH transmission layers).

The SRI may be given through an SRS resource indicator, which is a field in DCI, or may be configured through srs-ResourceIndicator which is higher signaling. At least one SRS resource may be configured for the terminal at the time of codebook-based PUSCH transmission, and for example, up to two SRS resources may be configured. In a case where an SRI is provided to the terminal through DCI, an SRS resource indicated by the corresponding SRI may indicate an SRS resource corresponding to the SRI among SRS resources transmitted before a PDCCH including the corresponding to SRI. In addition, a TPMI and a transmission rank may be given through precoding information and number of layers, which is a field in DCI, or may be configured by precodingAndNumberOfLayers which is higher signaling. A TPMI may be used to indicate a precoder applied to PUSCH transmission.

A precoder to be used for PUSCH transmission may be selected from in an uplink codebook having the same number of antenna ports as the value of nrofSRS-Ports in SRS-Config which is higher signaling. In a codebook-based PUSCH transmission, the terminal may determine a codebook subset, based on a TPMI and codebookSubset in pusch-Config which is higher signaling. codebookSubset in pusch-Config which is higher signaling may be configured to be one of "fullyAndPartialAndNonCoherent," "partialAndNonCoherent," or "nonCoherent," based on UE capability reported to the base station by the terminal.

If the terminal reports "partialAndNonCoherent" as UE capability, the terminal may not expect that the value of codebookSubset which is higher signaling is configured to be "fullyAndPartialAndNonCoherent." In addition, if the terminal reports "nonCoherent" as UE capability, the terminal may not expect that the value of codebookSubset which is higher signaling is configured to be "fullyAndPartialAndNonCoherent" or "partialAndNonCoherent." In a case where nrofSRS-Ports in SRS-ResourceSet which is higher signaling indicates two SRS antenna ports, the terminal may not expect that the value of codebookSubset which is higher signaling is configured to be "partialAndNonCoherent."

One SRS resource set configured to have "codebook" as the value of usage in SRS-ResourceSet which is higher signaling may be configured for the terminal, and one SRS resource in the corresponding SRS resource set may be indicated through an SRI. If several resources in an SRS resource set configured to have "codebook" as the value of usage in SRS-ResourceSet which is higher signaling are configured, the terminal may expect that the value of nrofSRS-Ports in SRS-Resource which is higher signaling is configured to be identical for all the SRS resources.

The terminal may transmit, to the base station, one or multiple SRS resources included in an SRS resource set configured to have "codebook" as the value of usage according to higher signaling, and the base station may select one from among the SRS resources transmitted by the terminal, and indicates the terminal to perform a PUSCH transmission by using transmission beam information of the corresponding SRS resource. In a codebook-based PUSCH transmission, an SRI may be used as information for selecting the index of one SRS resource, and may be included in DCI. Additionally, the base station may transmit information indicating a TPMI and a rank to be used by the terminal for a PUSCH transmission, after including the information in DCI. The terminal may use an SRS resource indicated by the SRI, to apply a precoder indicated by a TPMI and a rank indicated based on a transmission beam of the corresponding SRS resource, so as to perform a PUSCH transmission.

Next, non-codebook-based PUSCH transmission is described. Non-codebook-based PUSCH transmission may be dynamically scheduled through DCI format 0_0 or DCI format 0_1, or may be semi-statically operated by a configured grant. In a case where at least one SRS resource is configured in an SRS resource set configured to have "nonCodebook" as the value of usage in SRS-ResourceSet which is higher signaling, a non-codebook-based PUSCH transmission may be scheduled for the terminal through DCI format 0_1.

With respect to an SRS resource set configured to have "nonCodebook" as the value of usage in SRS-ResourceSet which is higher signaling, a non-zero power (NZP) CSI-RS resource associated with one SRS resource set may be configured for the terminal. The terminal may perform a calculation for a precoder for SRS transmission through a measurement of an NZP CSI-RS resource configured in association with an SRS resource set. In a case where a difference between the first symbol of an aperiodic SRS transmission by the terminal, and the last reception symbol of an aperiodic NZP CSI_RS resource associated with an SRS resource set is smaller than a particular symbol (e.g., 42 symbols), the terminal may not expect that information on a precoder for an SRS transmission is updated.

If the value of resourceType in SRS-ResourceSet which is higher signaling is configured to be "aperiodic," an NZP CSI-RS associated with the SRS-ResourceSet may be indicated by SRS request which is a field in DCI format 0_1 or DCI format 1_1. In a case where an NZP CSI-RS resource associated with SRS-ResourceSet is an aperiodic NZP CSI resource, and the value of SRS request which is a field in DCI format 0_1 or DCI format 1_1 is not "00," existence of an NZP CSI-RS associated with SRS-ResourceSet may be indicated. The corresponding DCI is required not to indicate scheduling of a cross carrier or a cross BWP. In addition, if the value of SRS request indicates existence of an NZP CSI-RS, the corresponding NZP CSI-RS may be positioned in a slot in which a PDCCH including an SRS request field is transmitted. TCI states configured for a scheduled sub-carrier may not be configured to be QCL-TypeD.

If a periodic or semi-persistent SRS resource set is configured, an NZP CSI-RS associated with the SRS resource set may be indicated through associatedCSI-RS in SRS-ResourceSet which is higher signaling. With respect to a non-codebook-based transmission, the terminal may not expect that spatialRelationInfo which is higher signaling for an SRS resource and associatedCSI-RS in SRS-ResourceSet which is higher signaling are configured together.

In a case where multiple SRS resources are configured for the terminal, the terminal may determine a precoder and a transmission rank to be applied to a PUSCH transmission, based on an SRI indicated by the base station. The SRI may be indicated through an SRS resource indicator, which is a field in DCI, or may be configured through srs-ResourceIndicator which is higher signaling. Similar to a codebook-based PUSCH transmission described above, in a case where an SRI is provided to the terminal through DCI, an SRS resource indicated by the corresponding SRI may indicate an SRS resource corresponding to the SRI among SRS resources transmitted before a PDCCH including the corresponding to SRI.

The terminal may use one or multiple SRS resources for an SRS transmission, and a maximum number of SRS resources and a maximum number of SRS resources which can be jointly transmitted in the same symbol in one SRS resource set may be determined based on UE capability reported by the terminal to the base station. The SRS resources jointly transmitted by the terminal may occupy the same RB. The terminal may configure one SRS port for each SRS resource. The number of SRS resource sets configured to have "nonCodebook" as the value of usage in SRS-ResourceSet which is higher signaling may be configured to be only one, and the number of SRS resources for non-codebook-based PUSCH transmission can be configured to up to four.

The base station may transmit one NZP CSI-RS associated with an SRS resource set to the terminal, and the terminal may calculate a precoder to be used at the time of transmission of one or multiple SRS resources in the corresponding SRS resource set, based on a result of measurement performed at the time of reception of the corresponding NZP CSI-RS. The terminal may apply the calculated precoder when transmitting, to the base station, one or multiple SRS resources in an SRS resource set configured to have "nonCodebook" as usage, and the base station may select one or multiple SRS resources among the received one or multiple SRS resources. In a non-codebook-based PUSCH transmission, an SRI may indicate an index which can represent one or a combination of multiple SRS resources, and the SRI may be included in DCI. The number of SRS resources indicated by an SRI transmitted by the base station may be the number of transmission layers of a PUSCH, and the terminal may transmit a PUSCH by applying a precoder applied to an SRS resource transmission to each of the layers.

Next, PUSCH repetitive transmission is described. When a PUSCH transmission is scheduled for the terminal through DCI format 0_1 in a PDCCH including a CRC scrambled with a C-RNTI, an MCS-C-RNTI, or a CS-RNTI, if pusch-AggregationFactor which is higher layer signaling is configured for the terminal, the same symbol allocation may be applied in as many consecutive slots as pusch-AggregationFactor, and the PUSCH transmission may be limited to a single rank transmission. For example, the terminal is required to repeat the same transport block (TB) in as many consecutive slots as pusch-AggregationFactor, and apply the same symbol allocation to each of the slots. [Table 8] shows a redundancy version applied to a PUSCH repetitive transmission for each slot. If a PUSCH repetitive transmission in multiple slots is scheduled for the terminal through DCI format 0_1, and at least one symbol among the slots in which the PUSCH repetitive transmission is performed is indicated to be a downlink symbol according to information of tdd-UL-DL-ConfigurationCommon or tdd-UL-DL-ConfigurationDedicated which is higher layer signaling, the terminal may not perform PUSCH transmission in a slot in which the corresponding symbol is positioned.

TABLE 8

| rv$_{id}$ indicated by the DCI scheduling the PUSCH | rv$_{id}$ to be applied to n$^{th}$ transmission occasion | | | |
| --- | --- | --- | --- | --- |
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Hereinafter, repetitive transmission of an uplink data channel (PUSCH) in a 5G system will be described in detail. A 5G system supports two types including PUSCH repetition type A and PUSCH repetition type B as a method for repetitive transmission of an uplink data channel. One of PUSCH repetition type A or B may be configured for the terminal through higher layer signaling.

PUSCH Repetition Type A

As described above, the starting symbol and the length of an uplink data channel may be determined in one slot by the time domain resource allocation method, and the base station may transmit the number of repetitive transmissions to the terminal through higher layer signaling (e.g., RRC signaling) or L1 signaling (e.g., DCI).

The terminal may repeatedly transmit an uplink data channel having the same starting symbol and the same length as the configured uplink data channel in consecutive slots, based on the number of repetitive transmissions received from the base station. The terminal may omit uplink data channel transmission in a slot configured as downlink for the terminal by the base station or in a corresponding slot of a case where at least one symbol among symbols in a slot configured for the terminal for uplink data channel repetitive transmission is configured as downlink. That is, the uplink data channel transmission may be included in the number of repetitive transmissions of the uplink data channel, but may not be performed.

PUSCH Repetition Type B

As described above, the starting symbol and the length of an uplink data channel may be determined in one slot by the time domain resource allocation method, and the base station may transmit numberofrepetitions, which is the number of repetitive transmissions, to the terminal through higher signaling (e.g., RRC signaling) or L1 signaling (e.g., DCI).

First, a nominal repetition of the uplink data channel may be determined as below based on the configured starting symbol and the length of then uplink data channel. The nominal repetition may indicate a resource of a symbol configured for PUSCH repetitive transmission by the base station, and the terminal may determine a resource usable as uplink in the configured nominal repetition. In this case, a slot in which the n-th nominal repetition starts may be given by $$K_s + \left\lfloor \frac{S + n \cdot L}{N_{symb}^{slot}} \right\rfloor,$$

and a symbol in which the nominal repetition starts in the starting slot may be given by mod(S+n·L, $N_{symb}^{slot}$). A slot in which the n-th nominal repetition ends may be given by $$K_s + \left\lfloor \frac{S + (n+1) \cdot L - 1}{N_{symb}^{slot}} \right\rfloor,$$

and a symbol in which the nominal repetition ends in the last slot may be given by mod(S+(n+1)·L−1, $N_{symb}^{slot}$). Herein, n=0, . . . , numberofrepetitions−1, S may denote the configured starting symbol of the uplink data channel, and L may denote the configured symbol length of the uplink data channel. $K_s$ may indicate a slot in which the PUSCH transmission starts, and $N_{symb}^{slot}$ may indicate the number of symbols per slot.

The terminal determines an invalid symbol for PUSCH repetition type B. A symbol configured as downlink by tdd-UL-DL-ConfigurationCommon or tdd-UL-DL-ConfigurationDedicated may be determined as an invalid symbol for PUSCH repetition type B. Additionally, an invalid symbol may be configured based on a higher layer parameter (e.g., InvalidSymbolPattern). For example, an invalid symbol may be configured by the higher layer parameter (e.g., InvalidSymbolPattern) providing a symbol level bitmap over one slot or two slots. A part indicated by 1 in the bitmap may indicate an invalid symbol.

Additionally, the period and the pattern of the bitmap may be configured through a higher layer parameter (e.g., periodicityAndPattern). In a case where a higher layer parameter (e.g., InvalidSymbolPattern) is configured, if the parameter InvalidSymbolPatternIndicator-ForDCIFormat0_1 or InvalidSymbolPatternIndicator-ForDCIFormat0_2 indicates 1, the terminal may apply an invalid symbol pattern, and if same indicates 0, the terminal may not apply an invalid symbol pattern. If a higher layer parameter (e.g., InvalidSymbolPattern) is configured, and the parameter InvalidSymbolPatternIndicator-ForDCIFormat0_1 or InvalidSymbolPatternIndicator-ForDCIFormat0_2 is not configured, the terminal may apply an invalid symbol pattern.

After an invalid symbol is determined in each nominal repetition, the terminal may consider, as valid symbols, symbols remaining after excluding the determined invalid symbol. If one or more valid symbols are included in each nominal repetition, the nominal repetition may include one or more actual repetitions. Each actual repetition may indicate a symbol actually used for PUSCH repetitive transmission among symbols configured as the configured nominal repetition, and may include a consecutive set of valid symbols which can be used for PUSCH repetition type B in one slot. The terminal may omit actual repetition transmission in a case where an actual repetition having one symbol is configured to be valid except for a case where the configured symbol length (L) of the uplink data channel is equal to 1 (L=1). A redundancy version is applied according to a redundancy version pattern configured for each n-th actual repetition.

Figure 5:
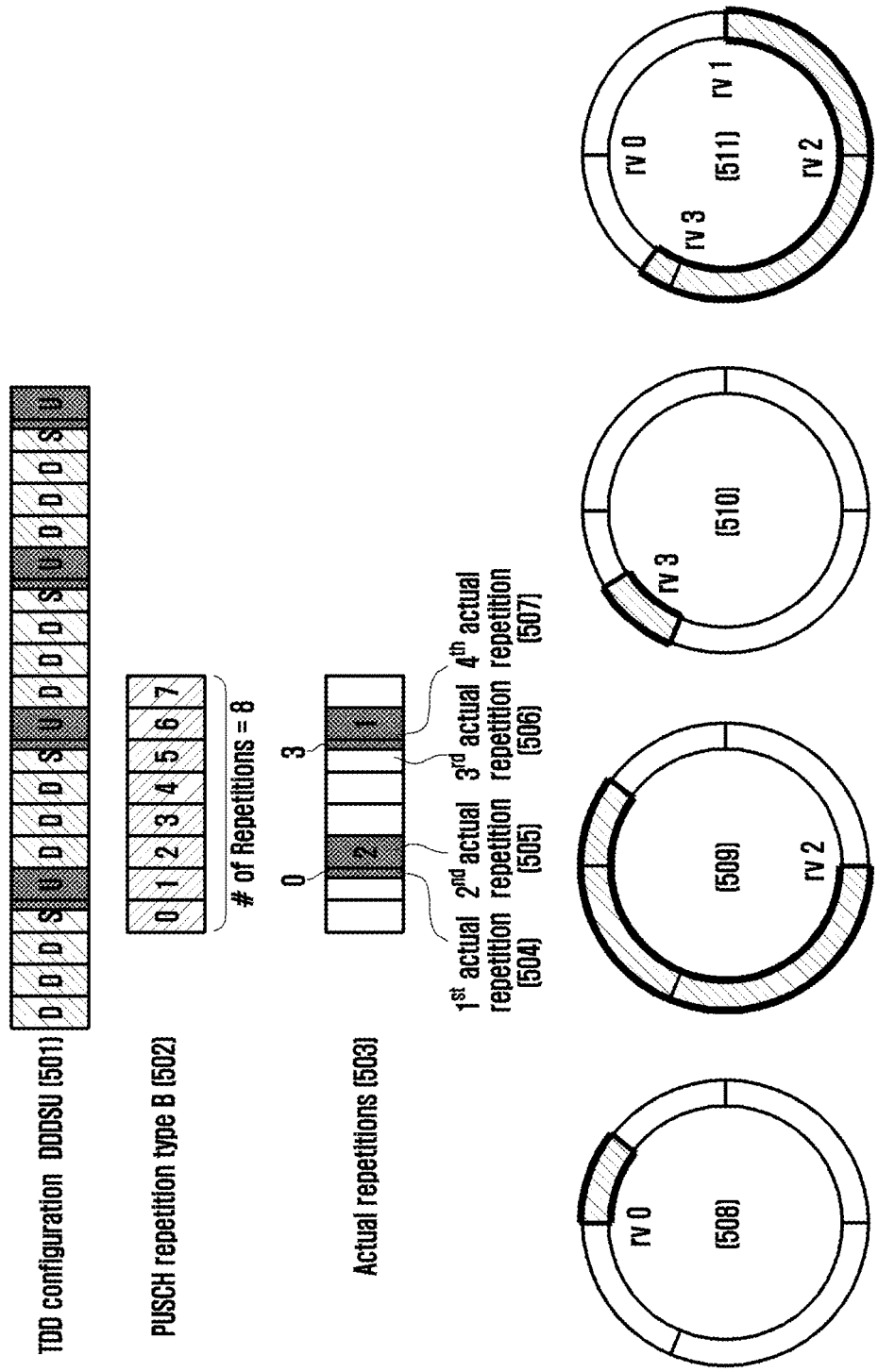
FIG. 5 is a diagram illustrating an example of PUSCH repetition type B in the 5G system.

FIG. 5 is a diagram illustrating an example of PUSCH repetition type B in the 5G system.

A frame structure of time division duplexing (TDD) may be configured for the UE as three downlink slots, one special/flexible slot, and one uplink slot. Here, when the special/flexible slot is composed of 11 downlink symbols and 3 uplink symbols, the initial transmission slot is the third in the second uplink transmission, and the UE is configured with 0 for the index of the start symbol of the uplink data channel and 14 for the length of the uplink data channel. If the number of repetitions repK is 8, nominal repetitions 502 appear in eight consecutive slots from the initial transmission slot. After that, the UE determines that the symbol configured as the downlink symbol in the frame structure 501 of the TDD system at each nominal repetition is an invalid symbol, and if the valid symbols are composed of one or more consecutive symbols in one slot, actual repetitions 503 may be transmitted. Thus, a total of four PUSCHs (repK_actual=4) can be actually transmitted.

In this case, if repK-RV is configured as 0-2-3-1, the RV in the PUSCH of the first resource 504 actually transmitted is 0, the RV in the PUSCH of the second resource 505 actually transmitted is 2, the RV in the PUSCH of the third resource 506 actually transmitted is 3, and the RV in the PUSCH of the fourth resource 507 actually transmitted is 1. In this case, only the PUSCH having the RV value of 0 or 3 can be decoded by itself. In case of the first and third resources 504 and 506, PUSCH is transmitted only in three symbols much less than actually configured symbol length (14 symbols), so that the rate-matched bit lengths 508 and 510 are smaller than the bit lengths 509 and 511 calculated by configuration.

Figure 6:
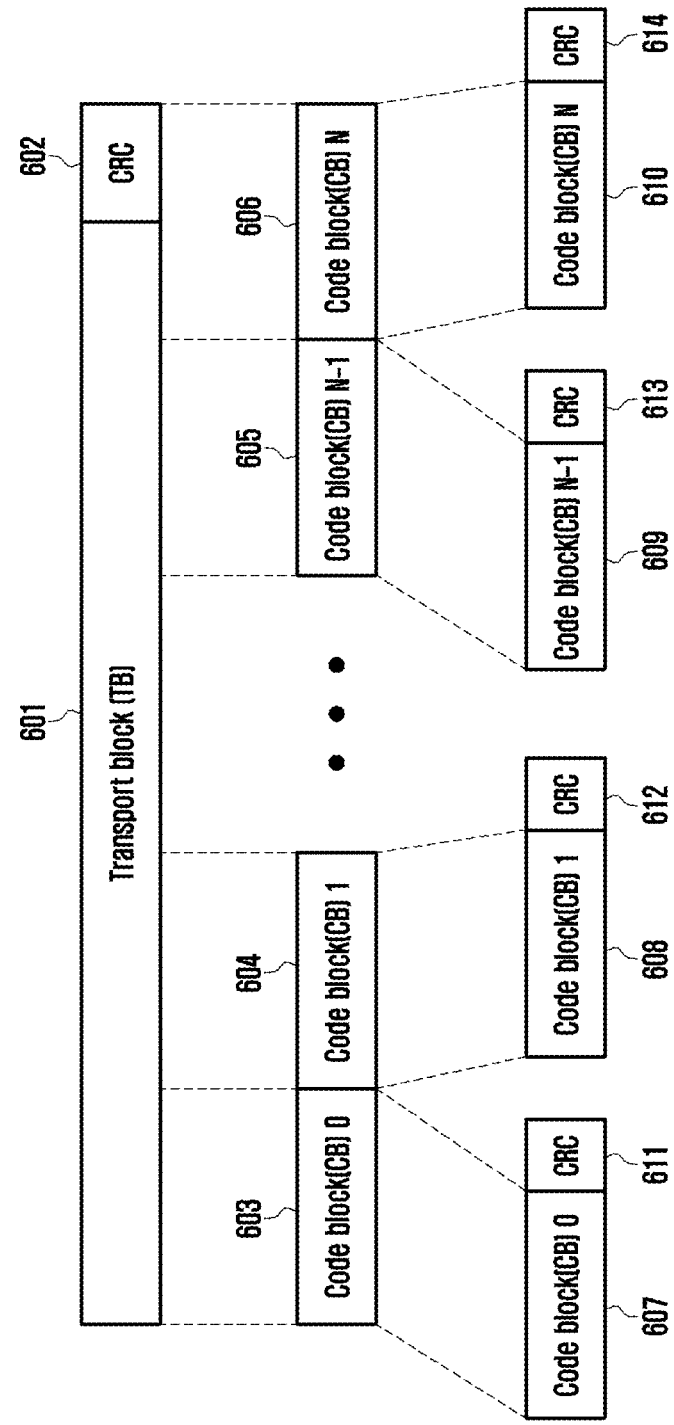
FIG. 6 is a diagram illustrating an example of a process in which one transport block (TB) is divided into several code blocks and a CRC is added in the 5G system according to embodiments of the present disclosure.

FIG. 6 is a diagram illustrating an example of a process in which one transport block (TB) is divided into several code blocks and a CRC is added in the 5G system.

With reference to FIG. 6, a CRC 602 may be added to the last or front part of one TB 601 to be transmitted in uplink or downlink. The CRC 602 may have 17 bits, 25 bits, a predetermined number of bits, or a variable number of bits depending on channel conditions, and may be used to determine whether channel coding is successful. A block formed by the TB 601 with the added CRC 602 may be divided into several code blocks (CBs) 603, 604, 605, and 606. In this case, the maximum size of the CB may be predetermined, and the last CB 606 may have a smaller size than the other CBs 603, 604, and 605. However, this is only an example, and in another example, by inserting 0, an arbitrary value, or 1 into the last CB 606, the last CB 606 and each of the other CBs 603, 604, and 605 may have the same length.

In addition, CRCs 611, 611, 612, and 613 may be added to the CBs 607, 608, 609, and 610, respectively. This CRC may have 17 bits, 24 bits, or a predetermined number of bits, and may be used to determine whether channel coding is successful. The TB 501 and a cyclic generator polynomial may be used to generate the CRC 602, and the cyclic generator polynomial may be defined in various ways. For example, assuming that the cyclic generator polynomial for 24-bit CRC, gCRC24A(D), is "D24+D23+D18+D18+D14+D11+D10+D7+D6+D5+D4+D3+D+1," and L is 24, for TB data $a_0, a_1, a_2, a_3, \ldots, a_{A-1}, p_1, p_2, \ldots, p_{L-1}$ in CRC $p_1$, $p_2, \ldots, p_{L-1}$ can be determined as a value whose remainder becomes 0 when $0D^{A+23}+a_1 D^{A+22}+ \ldots +a_{A-1}D^{24}+p_0D^{23}+p_1D^{22}+ \ldots +p_{22}D^1+p_{23}$ is divided by gCRC24A(D).

Although it is assumed in the above example that the CRC length L is 24, the CRC length L may be determined to be various lengths such as 12, 17, 24, 32, 40, 48, 64, and the like. As described above, after the CRC is added to the TB, the TB+CRC may be divided into N CBs 603, 604, 605, and 606. The CRC 611, 612, 613, or 614 may be added to each of the divided CBs 603, 604, 605, and 606. The CRC added to the CB may have a different length from that of the CRC added to the TB, or a different cyclic generator polynomial may be used to generate this CRC. In addition, the CRC 602 added to the TB and the CRCs 611, 612, 613, and 614 added to the CBs may be omitted depending on the type of a channel coding applied to the CB. For example, when the LDPC code, not the turbo code, is applied to the CB, the CRCs 611, 612, 613, and 614 to be inserted for the respective CBs may be omitted.

However, even when the LDPC code is applied, the CRCs 611, 612, 613, and 614 may be added to the CBs. Also, even when the polar code is used, the CRCs may be added or omitted. As described above in FIG. 6, the maximum length of one CB is determined depending on the type of channel coding applied, and the TB and the CRC added thereto may be divided into the CBs according to the maximum length of the CB. In the conventional LTE system, a CRC for CB is added to a divided CB, and CB data bits and the CRC are encoded with a channel code, so that coded bits are determined and the number of bits for rate matching (RM) to respective coded bits as promised in advance is determined.

Hereinafter, a method of calculating a transport block size (TBS) in a 5G system will be described in detail.

The number of resource elements (REs) allocated to PUSCH mapping in one PRB in the allocated resource, $N_{RE}'$ is calculated. The $N_{RE}'$ may be calculated as $N_{sc}^{RB} \times N_{symb}^{sh} - N_{DMRS}^{PRB} - N_{oh}^{PRB}$. Here, $NR_{sc}^{RB}$ may be 12, and $N_{symb}^{sh}$ may indicate the number of OFDM symbols allocated to the PUSCH. $N_{DMRS}^{PRB}$ is the number of REs in one PRB occupied by DMRSs of the same CDM group. $N_{oh}^{PRB}$ is the number of REs occupied by an overhead in a PRB as long as it is configured by higher layer signaling, and may be configured to one of 0, 6, 12, and 18. Thereafter, $N_{RE}$, the total number of REs allocated to the PUSCH, may be calculated. $N_{RE}$ is calculated as min(166,$N_{RE}'$)×$n_{PRB}$, and $n_{PRB}$ indicates the number of PRBs allocated to the UE. The number of temporary information bits $N_{info}$ may be calculated as $N_{RE}$×R×$Q_m$×v. Here, R is a code rate, $Q_m$ is a modulation order, and information on this value may be transmitted using an MCS bit field of DCI and a pre-arranged table. Also, v is the number of allocated layers. If $N_{info} \leq 3824$, TBS may be calculated through the following process. Otherwise, TBS may be calculated through step 4. $N_{info}'$ may be calculated through the formulas of $$N_{info}' = \max\left(24, 2^n \times \left\lfloor \frac{N_{info}}{2^n} \right\rfloor\right)$$

and n=max $(3, \lfloor \log_2(N_{info}) \rfloor - 6)$. TBS may be determined as a value closest to $N_{info}'$ among values not smaller than $N_{info}'$ in Table 9 below.

TABLE 9

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

If $N_{info} > 3824$, $N_{info}'$ may be calculated through the equations of $$N_{info}' = \max\left(3840, 2^n \times \text{round}\left(\frac{N_{info} - 24}{2^n}\right)\right)$$

and n=$\lfloor \log_2(N_{info} - 24) \rfloor - 5$. TBS may be determined through the value of $N_{info}'$ and the following [pseudo-code 1]. In the following, C corresponds to the number of code blocks (CBs) that one TB contains. [Table 10] shows the pseudo-code 1.

[Table 10] Pseudo-code

TABLE 10

| Pseudo-code |
|---|
| [Start Pseudo-code 1] <br> if R ≤ 1/4 <br> $$TBS = 8*C*\left\lceil \frac{N_{info}' + 24}{8*C} \right\rceil - 24, \text{ where } C = \left\lceil \frac{N_{info}' + 24}{3816} \right\rceil$$ <br> else <br>   if $N_{info}' > 8424$ <br> $$TBS = 8*C*\left\lceil \frac{N_{info}' + 24}{8*C} \right\rceil - 24, \text{ where } C = \left\lceil \frac{N_{info}' + 24}{8424} \right\rceil$$ <br>   else <br> $$TBS = 8*\left\lceil \frac{N_{info}' + 24}{8} \right\rceil - 24$$ |

TABLE 10-continued

Pseudo-code

```
        end if
    end if
[End of Pseudo-code 1]
```

The disclosure provides a method and/or embodiments for transmitting one transport block (TB) over a plurality of slots in a wireless communication system. In the disclosure, for convenience of description, a TB transmitted over a plurality of slots may be expressed as a transport block over multiple slots (TBoMS). The TBoMS may also be interpreted as "TB processing over multiple slots." However, the use of these terms does not limit the technical scope of the disclosure.

FIG. 7 is a diagram illustrating TB processing over multi-slot (TBoMS) PUSCH transmission in the 5G system.

Terminal may allocate one TB 701 to multiple slots 702, 703, 704, and 705 and transmit. In this case, by allocating one TB to the resources of the multiple slots 702, 703, 704, and 705, it is possible to obtain a low code rate, obtain a channel coding gain, and improve the channel coverage. Also, with reference to FIG. 7, as a time domain resource allocation method for TBoMS PUSCH transmission, a method 706 for allocating time domain resources like PUSCH repetition type A or a method 707 for allocating time domain resources like PUSCH repetition type B may be applied. When time domain resources are allocated to PUSCH for TBoMS like PUSCH repetition type A, the PUSCH may be transmitted in multiple slots having the same symbol resource for each slot. On the other hand, when time domain resources are allocated to PUSCH for TBoMS like PUSCH repetition type B, resources may be allocated as in Case 0 (708), Case 1 (709), or Case 2 (710) according to the length L of a symbol configured through higher layer signaling and L1 signaling.

In the disclosure, a method for determining a TBS when PUSCH transmission is configured with one TB allocated to multiple slots in the 5G communication system, and a method for mapping an occasion and redundancy version for a multi-slot PUSCH will be described. The PUSCH transmission with one TB allocated to multiple slots (TB processing over multi-slot (TBoMS)) according to an embodiment of the disclosure may be used to improve the performance of channel estimation through channel coding with a low code rate and improve the channel coverage.

According to an embodiment of the disclosure, an operating method of a UE for determining one TBS for multi-slot PUSCH and mapping a PUSCH occasion and redundancy version of the multi-slot PUSCH composed of one TB, based on a physical uplink shared channel (PUSCH) in which one TB is transmitted in multiple slots, may include receiving, from a base station, multi-slot transmission (TBoMS) configuration information for transmitting a PUSCH composed of one TB in multiple slots; receiving, from the base station, TBS determination and PUSCH occasion and redundancy version configuration information of the PUSCH composed of one TB in multiple slots; and transmitting, to the base station, multi-slot PUSCH configured with one TB according to a TBS determination and PUSCH occasion and redundancy version mapping method for multi-slot PUSCH transmission composed of one TB based on the configured TBS determination and PUSCH occasion and redundancy version configuration information.

According to an embodiment of the disclosure, an operating method of a base station for determining one TBS for multi-slot PUSCH and mapping a PUSCH occasion and redundancy version of the multi-slot PUSCH composed of one TB, based on a physical uplink shared channel (PUSCH) in which one TB is transmitted in multiple slots, may include transmitting, to a UE, multi-slot transmission (TBoMS) configuration information for transmitting a PUSCH composed of one TB in multiple slots; transmitting, to the UE, TBS determination and PUSCH occasion and redundancy version configuration information of the PUSCH composed of one TB in multiple slots; and receiving, from the UE, multi-slot PUSCH configured with one TB according to a TBS determination and PUSCH occasion and redundancy version mapping method for multi-slot PUSCH transmission composed of one TB based on the configured TBS determination and PUSCH occasion and redundancy version configuration information.

According to the disclosure, a TBS determination method and a PUSCH occasion and redundancy version mapping method for multi-slot PUSCH repetition configured with one TB will be described through embodiments.

The embodiments provide the TBS determination method and the PUSCH occasion and redundancy version mapping method for multi-slot PUSCH repetition configured with one TB in the 5G system. The TBS determination and PUSCH occasion and redundancy version mapping methods according to the embodiments of the disclosure may be applied to obtain a channel coding gain through a low code rate and to improve uplink coverage. Hereinafter, the PUSCH repetition will be described as an example in describing the embodiments of the disclosure, but this is only for illustration and does not limit the scope of the disclosure. The embodiments of the disclosure may also be applied to cases of PUSCH/PDSCH/PSSCH transmission defined/configured in advance or through signaling between a base station and a UE. In addition, in the TBS determination and PUSCH occasion and redundancy version mapping methods applied to multi-slot PUSCH transmission configured with one TB to be described herein, any value defined/configured in advance or through signaling between the base station and the UE may be one or a combination of the symbol/slot length, the consecutive/nonconsecutive property of PUSCH transmission, the interval between PUSCH transmissions, the number of PUSCH transmissions, etc.

First Embodiment

A first embodiment of the disclosure provides a method and apparatus for calculating a TBS when performing TBoMS transmission in which one TB is transmitted through PUSCH in multiple slots. Although the disclosure focuses on an example of PUSCH transmission, this method may also be applied to PDSCH/PSSCH transmission.

Figure 8:
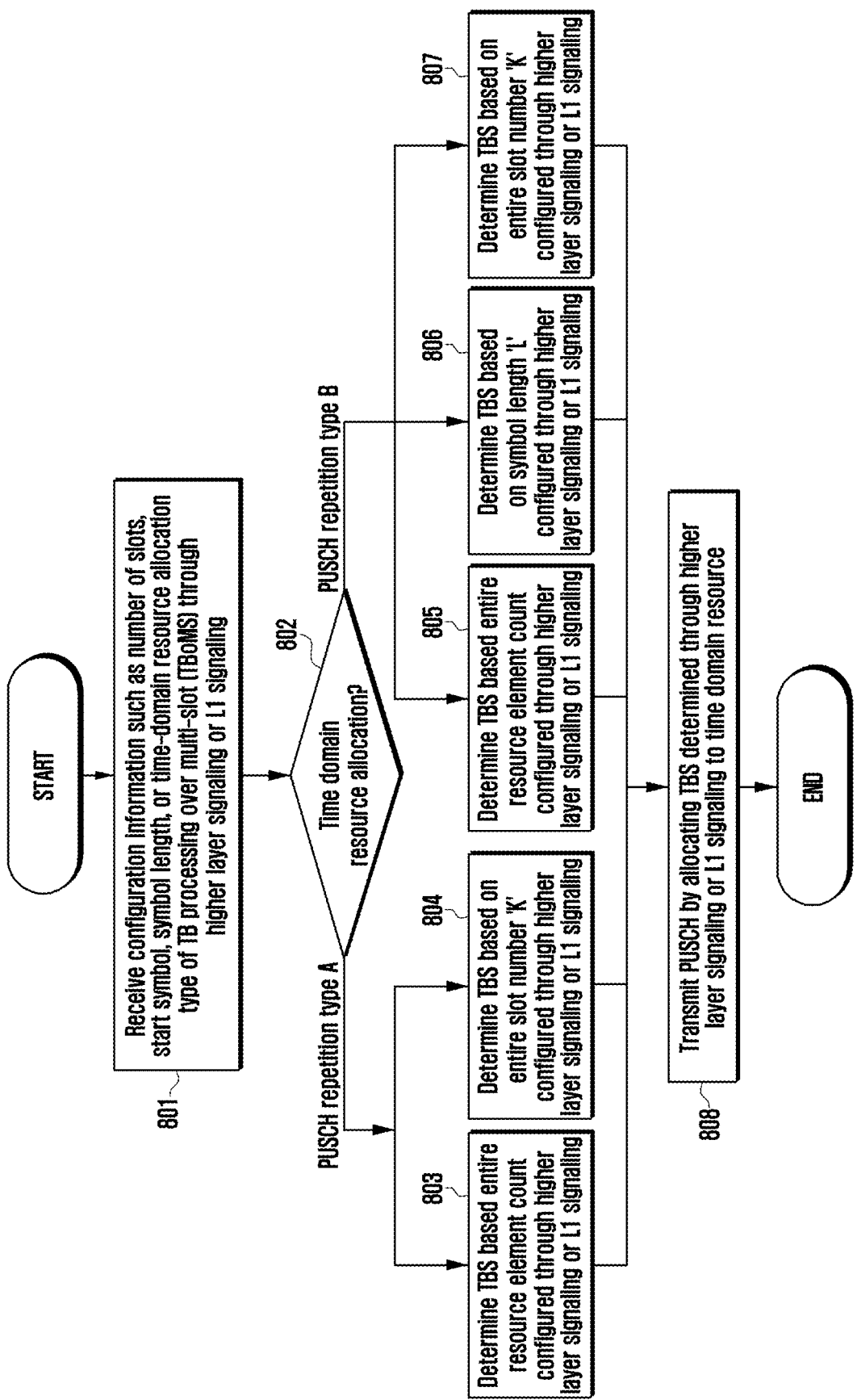
FIG. 8 is a flow diagram illustrating a process of a UE for determining TBS of multi-slot PUSCH transmission (TBoMS) composed of one TB according to embodiments of the present disclosure.

FIG. 8 is a flow diagram illustrating an operation of a UE for determining a TBS according to a configured time domain type of multi-slot PUSCH transmission composed of one TB in the 5G system according to embodiments of the present disclosure.

At step 801, the UE may receive configuration information for transmitting a multi-slot PUSCH composed of one TB from a base station through higher layer signaling or L1 signaling. The configuration information may include the number of slots, a start symbol, a symbol length, and/or a time-domain resource allocation (TDRA) type for transmitting the multi-slot PUSCH composed of one TB. At step 802, based on the time-domain resource allocation type configured by the base station, the UE may apply a TBS determination method to the multi-slot PUSCH. When the time-domain resource allocation type is configured as the PUSCH repetition type A, the TBS may be determined by one or combination of a method 803 for determining the TBS by calculating all resource elements (REs) of multiple slots for transmitting one TB or a method 804 for determining the TBS by scaling one slot-based TBS determination based on an arbitrary number "K" of multiple slots configured through higher layer signaling or L1 signaling from the base station. On the other hand, when the time-domain resource allocation type is configured as the PUSCH repetition type B, the TBS may be determined by one or combination of a method 805 for determining the TBS by calculating all REs of multiple slots for transmitting one TB, a method 806 for determining the TBS based on an arbitrary symbol length "L" configured through higher layer signaling or L1 signaling from the base station, or a method 807 for determining the TBS based on an arbitrary number "K" of multiple slots configured through higher layer signaling or L1 signaling from the base station. At step 808, the UE may transmit the PUSCH by allocating the TBS determined based on higher layer signaling or L1 signaling to resources of multiple slots.

The disclosure provides a TBS determination method and equations according to the TBS determination methods 803, 804, 805, 806, and 807 described in FIG. 8. According to the method provided in the disclosure, one TB may be allocated to multiple slots to have a low code rate. Through this, it is possible to obtain a channel coding gain and improve a channel coverage.

For TBS calculation in the 5G system, $N_{RE}'$ may be calculated as $N_{sc}^{RB} \times N_{symb}^{sh} - N_{DMRS}^{PRB} - N_{oh}^{PRB}$ as described above. Here, $N_{sc}^{RB}$ is the number of subcarriers allocated for PUSCH repetition. In the above, $N_{symb}^{sh}$ configured through higher layer signaling (e.g., RRC signaling) or L1 signaling (e.g., DCI format 0_1, DCI format 0_2, and DCI format 0_0) may indicate the total number of OFDM or SC-FDMA symbols allocated to the PUSCH, and may indicate the number of all symbols in case of transmission over multiple slots. Also, $N_{DMRS}^{PRS}$ denotes the number of REs occupied by DMRS of the same CDM group in the allocated resource area. In addition, $N_{oh}^{PRB}$ configured as xOverhead of higher layer signaling PUSCH-ServingCell-Config is the number of REs occupied by overhead in one PRB, and may be configured as one of 0, 6, 12, and 18.

Thereafter, the UE may calculate the total number of REs $N_{RE}$ allocated to the PUSCH. Here, $N_{RE}$ is calculated as $\min(166, N_{RE}') \times n_{PRB}$, and $n_{PRB}$ denotes the number of PRBs allocated to the UE. When performing the PUSCH repetition with a long symbol, the value of $N_{RE}'$ may be calculated based on $N_{symb}^{sh} > 14$. In case of $N_{symb}^{sh} > 14$, $N_{RE}$ may be determined using one or any combination of the following methods. Also, the number of temporary information bits $N_{info}$ may be calculated as $N_{RE} \times R \times Q_m \times v$. The TBS determination method and equation for allocating one TB to the multi-slot PUSCH may be determined using one or any combination of the following methods.

[Method 1-1]

The method 1-1 provides, among the above-described TBS determination methods, the TBS determination methods 803 and 805 according to all REs configured with higher layer signaling or L1 signaling.

In order to determine the TBS for transmitting one TB in the multi-slot PUSCH, $N_{RE}'$ may be calculated as $N_{sc}^{RB} \times N_{symb}^{sh} - N_{DMRS}^{PRB} - N_{oh}^{PRB}$. In this case, when the actual number of TBSs is determined by calculating the total number of REs, $N_{sc}^{RB} \times N_{symb}^{sh}$ may be determined as the total number of REs $N_{sc}^{RB} \times N_{TBoME,symb}^{sh}$ based on the total number of symbols of the multiple slots, and $N_{DMRS}^{PRB}$ may be determined as the number of REs of the total DMRS of the total multi-slot PUSCH $N_{TBoMS,DMRS}^{PRB}$. For $N_{oh}^{PRE}$, the actual number of REs of $N_{oh}^{PRE}$ may be determined according to the time-domain resource allocation method of TboMS configured with higher layer signaling and L1 signaling. When time domain resources are allocated as in the PUSCH repetition type A, $N_{TBoMS,oh}^{PRB}$ may be calculated as the product $N_{TBoMS,oh}^{PRB} = K \times N_{oh}^{PRS}$ of the number of multiple slots "K" and the number of overhead REs configured as xOverhead of higher layer signaling PUSCH-servingCellConfig.

On the other hand, when time domain resources are allocated as in the PUSCH repetition type B, $N_{TBoMS,oh}^{PRB}$ may be calculated as $$N_{TBoMS,oh}^{PRB} = \left\lceil \frac{N_{TBoMS,symb}^{th}}{14} \right\rceil \times N_{oh}^{PRB}$$

based on the number of symbols $N_{TBoMS,symb}^{sh}$ actually transmitted in the multiple slots and the number of overhead REs configured as xOverhead of higher layer signaling PUSCH-servingCellConfig. With the above equation, may be calculated as $N_{sc}^{RB} \times N_{TBoMS,symb}^{sh} - N_{TBoMS,DMRS}^{PRB} - N_{TBoMS,oh}^{PRB}$. Through the above method, it is possible to obtain the actual total number of REs $N_{TBoMS,RE}'$ for data transmission in multiple slots. In this case, the legacy $N_{RE}$ is calculated as $\min(166, N_{RE}') \times n_{PRB}$, and $n_{PRB}$ denotes the number of PRBs allocated to the UE.

Because $N_{RE}$ is a TBS determination equation calculated based on one slot, and the definition of $N_{TBoMS,RE}$ for TBoMS is required. At this time, when performing the TBoMS-based PUSCH transmission, the value of $N_{TBoMS,RE}'$ may be calculated based on multiple slots (i.e., $N_{TBoMS,symb}^{sh} > 14$) In case of TBS determination for multiple slots, $N_{TBoMS,RE}$ may be determined using one or any combination of the following methods.

[Method 1-1-1]

When the TBoMS is configured by the base station, $N_{TBoMS,RE}$ may be calculated as $\min(N_{sc}^{RB} \times N_{TBoMS,symb}^{sh}, N_{TBoMS,RE}') \times n_{PRB}$ or $\min(N_{sc}^{RB} \times N_{TBoMS,symb}^{sh} - N_{TBoMS,DMRS}^{PRB}, N_{TBoMS,RE}') \times n_{PRB}$ or $\min(N_{sc}^{RB} \times N_{TBoMS,symb}^{sh} - N_{TBoMS,DMRS}^{PRB} - N_{TBoMS,oh}^{PRB}, N_{TBoMS,RE}') \times n_{PRB}$. Through the above method, the PUSCH transmission for the TBoMS may be possible. According to the method 1-1-1, the UE may flexibly determine the value of $N_{TBoMS,RE}$ according to $N_{TBoMS,symb}^{sh}$ by using the above equation $N_{TBoMS,RE}'$.

[Method 1-1-2]

When the TBoMS is configured by the base station, $N_{TBoMS,RE}$ may be calculated as $$\min\left(166 \times \left\lceil \frac{N_{TBoMS,symb}^{sh}}{14} \right\rceil, N_{TBoMS,RE}'\right) \times n_{PRB}.$$

Through the above method, the PUSCH transmission for the TBoMS may be possible. According to the method 1-1-2, the UE may reuse the value of 166 by using the value of the quotient obtained by dividing $N_{TBoMS,symb}^{sh}$ by 14.

[Method 1-1-3]

When the TBoMS is configured by the base station, $N_{TBoMS,RE}'$ may not be calculated as $\min(166, N_{TBoMS,RE}') \times n_{PRB}$ and may be determined as $N_{TBoMS,RE} = N_{TBoMS,RS}' \times n_{PRB}$. Through the above method, the PUSCH repetition for the TBoMS may be possible. According to the method 1-1-3, the complexity of the UE may be reduced.

The TBS for TBoMS may be calculated by applying the legacy TBS calculation equation for one slot as the TBS calculation equation for multiple slots through the above methods (method 1-1-1, method 1-1-2, and method 1-1-3). Thereafter, the number of temporary information bits $N_{TBoMS,info}$ for the TBoMS may be calculated as $N_{TBoMS,RE} \times R \times Q_m \times v$. In case of the TBoMS, $N_{TBoMS,info}$ may be calculated as $$(N_{RE} \times R \times Q_m \times v) / \left\lceil \frac{N'_{TBoMS,RE}}{14 \times N_{sc}^{RB}} \right\rceil$$

in order to have a low code rate and perform rate matching to time resources of the multi-slot PUSCH. Through this, as $N_{TBoMS,RE}$ for multiple slots is determined, the code rate R may be calculated as a value of $$R / \left\lceil \frac{N'_{TBoMS,RE}}{14 \times N_{sc}^{RB}} \right\rceil.$$

Thereafter, if $N_{TBoMS,info} \leq 3324$, the TBS may be determined through the value of $N_{TBoMS,info}'$ and Table 9 given above, and if $N_{TBoMS,info} > 0.324$, the TBS may be determined through the value of $N_{TBoMS,info}'$ and the aforementioned pseudo-code 1. The above method provides an approach for determining the TBS of the PUSCH for the TBoMS through a method of directly calculating the total number of REs.

[Method 1-2]

The method 1-2 provides, among the above-described TBS determination methods, the TBS determination methods 804 and 807 according to the number of multiple slots "K" configured with higher layer signaling or L1 signaling.

In order to determine the TBS for transmitting one TB in the multi-slot PUSCH, $N_{RE}'$ of the first slot may be calculated as $N_{sc}^{RB} \times N_{symb}^{sh} - N_{DMRS}^{PRB} - N_{oh}^{PRB}$. In this case, if the TBoMS is configured and the number of multiple slots "K" is configured through higher layer signaling and L1 signaling, $N_{TBoMS,RE}'$ may be calculated by scaling the first slot $N_{RE}'$ with the number of multiple slots "K." Here, $N_{sc}^{RB} \times N_{symb}^{sh}$ may be determined as $K \times N_{sc}^{RB} \times N_{symb}^{sh}$ based on the number of multiple slots "K," and $N_{TBoMS,DMRS}^{PRB}$ may be determined as $K \times N_{DMRS}^{PRB}$. Also, $N_{TBoMS,oh}^{PRB}$ may be determined based on the number of multiple slots "K" and $N_{oh}^{PRB}$ configured with higher layer signaling and L1 signaling. In addition, $N_{TBoMS,oh}^{PRB}$ may be calculated as the product $N_{TBoMS,oh}^{PRB} = K \times N_{oh}^{PRB}$ of the number of multiple slots "K" and the number of overhead REs configured as xOverhead of higher layer signaling PUSCH-servingCellConfig.

Through the above-described equation, $N_{TBoMS,RE}'$ may be calculated as $K \times (N_{sc}^{RB} \times N_{symb}^{sh} - N_{DMRS}^{PRB} - N_{oh}^{PRB})$. Thereafter, $N_{TBoMS,RE}'$ may be applied equally as in the method 1-1. Therefore, the description of the calculation of $N_{TBoMS,RE}$ is omitted. Thereafter, the number of temporary information bits $N_{TBoMS,info}$ for the TBoMS may be calculated as $N_{TBoMS,RE} \times R \times Q_m \times v$. In case of the TBoMS, $N_{TBoMS,info}$ may be calculated as $(N_{TBoMS,RE} \times R \times Q_m \times v) / K$ in order to have a low code rate and perform rate matching to time resources of the multi-slot PUSCH. Through this, as $N_{TBoMS,RE}$ for multiple slots is determined, the code rate R may be calculated as a value of R/K. Thereafter, if $N_{TBoMS,info} \leq 3824$, the TBS may be determined through the value of $N_{TBoMS,info}'$ and Table 9 given above, and if $N_{TBoMS,info} > 3824$, the TBS may be determined through the value of $N_{TBoMS,info}'$ and the aforementioned pseudo-code 1. The above method provides an approach for determining the TBS of the PUSCH for the TBoMS through a method of performing scaling with the number of multiple slots "K" based on the first slot of the TBoMS.

[Method 1-3]

The method 1-3 provides, among the above-described TBS determination methods, the TBS determination method 806 according to the symbol length "L" configured with higher layer signaling or L1 signaling.

In order to determine the TBS for transmitting one TB in the multi-slot PUSCH, if the time-domain resource allocation method of TboMS is configured as the PUSCH repetition type B through higher layer signaling and L1 signaling, $N_{TBoMS,RE}'$ may be calculated as $N_{sc}^{RB} \times N_{TBoMS,symb}^{sh} - N_{TBoMS,DMRS}^{PRB} - N_{TBoMS,oh}^{PRB}$. In this case, when the TboMS is configured and the number of TboMS symbols "L" is configured through higher layer signaling and L1 signaling, $N_{TBoMS,RE}'$ may be calculated by scaling with the number of TboMS symbols "L" in the first slot $N_{RE}'$. Here, $N_{sc}^{RB} \times N_{symb}^{sh}$ may be determined as $$\left\lceil \frac{L}{14} \right\rceil \times N_{sc}^{RB} \times N_{symb}^{sh} \text{ or } N_{sc}^{RB} \times N_{TBoMS,symb}^{sh}$$

based on the number of TboMS symbols "L," and $N_{TBoMS,DMRS}^{PRB}$ may be determined as $$\left\lceil \frac{L}{14} \right\rceil \times N_{DMRS}^{PRE} \text{ or}$$

the number of REs $N_{TBoMS,DMRS}^{PRB}$ of DMRS actually transmitted in the symbol length "L" of TboMS. Also, $N_{TBoMS,oh}^{PRS'}$ may be determined based on $N_{oh}^{PRB}$ and the TboMS symbol length "L" configured with higher layer signaling and L1 signaling.

In addition, $N_{TBoMS,oh}^{PRB}$ may be calculated as $$N_{TBoMS,oh}^{PRB} = \left\lceil \frac{L}{14} \right\rceil \times N_{oh}^{PRB},$$

the scaling of the TBoMS symbol length "L" and the number of overhead REs configured as xOverhead of higher layer signaling PUSCH-servingCellConfig. Through the above-described equation, $N_{TBoMS,RE}'$ may be calculated as $(N_{sc}^{RB} \times N_{TBoMS,symb}^{sh} - N_{TBoMS,DMRS}^{PRB} - N_{TBoMS,oh}^{PRB})$. Thereafter, $N_{TBoMS,RE}$ may be applied equally as in the method 1-1. Therefore, the description of the calculation of $N_{TBoMS,RE}$ is omitted. Thereafter, the number of temporary information bits $N_{TBoMS,info}$ for the TBoMS may be calculated as $N_{TBoMS,RE} \times R \times Q_m \times v$. In case of the TBoMS, $N_{TBoMS,info}$ may be calculated as $$(N_{TBoMS,RE} \times R \times Q_m \times v) / \left\lceil \frac{L}{14} \right\rceil$$

in order to have a low code rate and perform rate matching to time resources of the multi-slot PUSCH. Through this, as $N_{TBoMS,RE}$ for multiple slots is determined, the code rate R may be calculated as a value of $$R / \left\lceil \frac{L}{14} \right\rceil.$$

Thereafter, if $N_{TBoMS,info} \leq 3324$, the TBS may be determined through the value of $N_{TBoMS,info}'$ and Table 9 given above, and if $N_{TBoMS,RE} > 3824$, the TBS may be determined through the value of $N_{TBoMS,info}'$ and the aforementioned pseudo-code 1.

The above method provides an approach for determining the TBS of the PUSCH for the TBoMS through a method of calculation based on the TBoMS symbol length "L" configured through higher layer signaling and L1 signaling when the TBoMS is allocated to time domain resources as in the PUSCH repetition type B.

In the above method, when scaling is applied with the number of multiple slots and the symbol length based on the first slot of TBoMS, the total $N_{TBoMS,RE}'$ may be calculated by applying the average value of each of $N_{RE}'$, $N_{sc}^{RB}$, $N_{symb}^{sh}$, $N_{DMRS}^{PRB}$, $N_{oh}^{PRB}$ of multiple slots of the entire TBoMS based on a value of $N_{RE}'$ in the first slot. The symbol length L in the disclosure is not limited to 14 or less and may be configured more than 14 through higher layer signaling and L1 signaling for the TBoMS. In addition, in order to determine the TBS having a low code rate of the TBoMS, the maximum TBS follows the legacy size. Therefore, the TBoMS may be configured through higher layer signaling and L1 signaling and determined as $TBS_{TBoMS}=\min(\text{Legacy maximum TBS}, TBS_{TBoMS})$ for multiple slots. In this case, the legacy maximum TBS may be determined by numerology and the max TBS determination equation for one slot described above.

Figure 9:
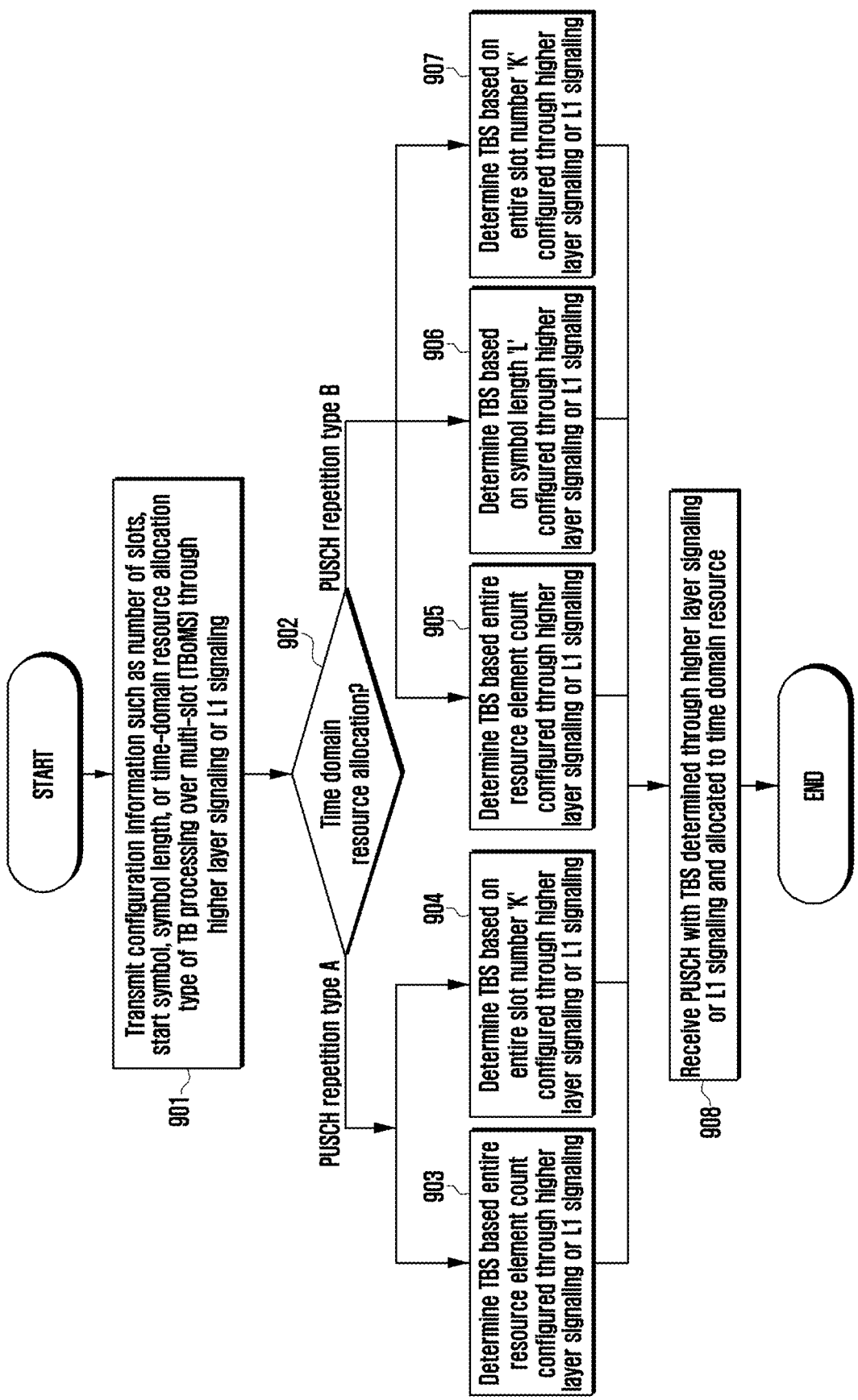
FIG. 9 is a flow diagram illustrating a process of a base station for determining TBS of multi-slot PUSCH transmission (TBoMS) composed of one TB according to embodiments of the present disclosure.

FIG. 9 is a flow diagram illustrating an operation of a base station for determining a TBS according to a configured time domain type of multi-slot PUSCH transmission composed of one TB in the 5G system according to embodiments of the present disclosure.

At step 901, the base station may transmit configuration information for transmitting a multi-slot PUSCH composed of one TB to a UE through higher layer signaling or L1 signaling. The configuration information may include the number of slots, a start symbol, a symbol length, and/or a time-domain resource allocation (TDRA) type for transmitting the multi-slot PUSCH composed of one TB. At step 902, based on the time-domain resource allocation type configured by the base station, a TBS determination method may be applied to the multi-slot PUSCH. When the time-domain resource allocation type is configured as the PUSCH repetition type A, the TBS may be determined by one or combination of a method 903 for determining the TBS by calculating all resource elements (REs) of multiple slots for transmitting one TB or a method 904 for determining the TBS by scaling one slot-based TBS determination based on an arbitrary number "K" of multiple slots configured through higher layer signaling or L1 signaling from the base station.

On the other hand, when the time-domain resource allocation type is configured as the PUSCH repetition type B, the TBS may be determined by one or combination of a method 905 for determining the TBS by calculating all REs of multiple slots for transmitting one TB, a method 906 for determining the TBS based on an arbitrary symbol length "L" configured through higher layer signaling or L1 signaling from the base station, or a method 907 for determining the TBS based on an arbitrary number "K" of multiple slots configured through higher layer signaling or L1 signaling from the base station. At step 908, the TBS determined through higher layer signaling or L1 signaling may be allocated to resources of multiple slots, and the base station may receive the TBoMS PUSCH. The disclosure provides a TBS determination method and equations according to the TBS determination methods 903, 904, 905, 906, and 907 described in FIG. 9. According to the method provided in the disclosure, one TB may be allocated to multiple slots to have a low code rate.

Through the TBS determination method of the disclosure for multi-slot PUSCH transmission composed of one TB, it is possible to obtain a low code rate and improve the channel coverage through a channel coding gain.

Second Embodiment

The second embodiment of the disclosure provides a method for configuring a PUSCH occasion and redundancy version pattern for a TBoMS PUSCH when multi-slot PUSCH transmission composed of one TB (TBoMS) is configured as the PUSCH repetition type A.

When the multi-slot PUSCH transmission composed of one TB (TBoMS) is configured from the base station through higher layer signaling and L1 signaling, the UE may allocate the PUSCH occasion and perform mapping of the redundancy version, based on the time-domain resource allocation type, whether to segment the code block or not, and the consecutive/nonconsecutive property of the transmitted multi-slot PUSCH.

FIG. 10 is a diagram illustrating an example of PUSCH occasion and redundancy version mapping in a multi-slot PUSCH transmission (TBoMS) composed of a single code block and one TB allocated with time domain resources like PUSCH repetition type A according to embodiments of the present disclosure.

With reference to FIG. 10, the multi-slot PUSCH transmission (TBoMS) composed of a single code block configured through higher layer signaling and L1 signaling and one TB allocated with time domain resources like the PUSCH repetition type A may be allocated to consecutive physical slots and transmitted (1001). In this case, the PUSCH occasion and redundancy version mapping method may be determined using one or any combination of the following methods.

[Method 2-1]

In the method 2-1, when the multi-slot PUSCH transmission composed of one TB (TBoMS) is configured with higher layer signaling and L1 signaling, and when the number of multiple slots "K" of TBoMS is configured, the UE may configure the PUSCH occasion i of each of the multiple slots as 1, 2, . . . , K−1, K. Thereafter, the UE may configure a redundancy version based on the configured PUSCH occasion. If a redundancy version pattern is configured to {0, 2, 3, 1} through higher layer signaling or L1 signaling, mapping may be performed by applying the redundancy version pattern with n=modulo(i, 4) based on the PUSCH occasion i (1003). When the PUSCH occasion is configured based on the above-described method 2-1, it is easy to control each PUSCH based on the occasion.

[Method 2-2]

In the method 2-2, when the multi-slot PUSCH transmission composed of one TB (TBoMS) is configured with higher layer signaling and L1 signaling, and when the number of multiple slots "K" of TBoMS is configured, the UE may configure the same PUSCH occasion i and the same redundancy version pattern to multiple slots (1004). For example, if the RV value (RVid) is configured by higher layer signaling or L1 signaling, the same RV may be applied to PUSCH transmission of TBoMS. In the example of Case 1 of FIG. 10, the same RV #0 may be applied to PUSCH transmitted in slot 0, slot 1, slot 2, and slot 3. When the PUSCH occasion and the redundancy version are configured based on the above-described method 2-2, it is possible to control the multiple slots for TBoMS with the same configuration and low complexity.

[Method 2-3]

In the method 2-3, when the multi-slot PUSCH transmission composed of one TB (TBoMS) is configured with higher layer signaling and L1 signaling, and when the number of multiple slots "K" of TBoMS and the number of slots "x" for controlling consecutive PUSCHs at once are configured, the UE may configure the PUSCH occasion i of each of the multiple slots as 1, 2, . . . , K−1, K, and then configure the redundancy version with i=mod(i, x). Referring to Case 2 (1005) of FIG. 10, if the number of TBoMS multiple slots "K" is configured as 4 and the number of slots "x" for controlling consecutive PUSCHs at once is configured as 2, the occasion i of PUSCH transmitted in Slot 0 and Slot 1 may be configured as 0, and the occasion i of PUSCH transmitted in Slot 2 and Slot 3 may be configured as 1 (1005).

Thereafter, the UE may configure the redundancy version based on the configured PUSCH occasion. If the redundancy version pattern is configured to {0, 2, 3, 1} through higher layer signaling or L1 signaling, the UE may perform mapping by applying the redundancy version pattern with n=modulo(i, 4) based on the PUSCH occasion i (1005). RV #0 may be applied to PUSCH transmission in slots 0 and 1, and RV #2 may be applied to PUSCH transmission in slots 2 and 3. Using the method 2-3 may enable continuous PUSCH control based on an arbitrary variable "x" configured by higher layer signaling and L1 signaling in multiple slots of TboMS. In this case, it is easy to apply simultaneous channel estimation, frequency hopping, and power control to the TboMS.

With reference to FIG. 10, the multi-slot PUSCH transmission (TboMS) composed of a single code block configured through higher layer signaling and L1 signaling and one TB allocated with time domain resources like the PUSCH repetition type A may be allocated to nonconsecutive physical slots and transmitted (1002). When the TboMS is configured with higher layer signaling and L1 signaling and the TboMS is applied to nonconsecutive physical PUSCHs, the PUSCH occasion i may increase for each nonconsecutive interval. Referring to Case 3 of FIG. 10, the PUSCH occasion of the initial PUSCH transmission for TboMS in Slot 0 may be configured as 0. Then, the PUSCH occasion i+1 is applied to each of the nonconsecutive interval of Slot 0 and Slot N and the nonconsecutive interval of Slot N+1 and Slot M, and the same PUSCH occasion i may be configured as 1 in the consecutive Slot N and Slot N+1 (1006).

In this case, the above-described method 2-2 or method 2-3 may be applied to the consecutive PUSCH for TBoMS. When the redundancy version pattern is set to {0, 2, 3, 1} through higher layer signaling or L1 signaling, RV #0 may be applied to PUSCH transmission in slot 0 corresponding to PUSCH Occasion i=0, RV #2 may be applied to PUSCH transmission in slot N and slot N+1 corresponding to PUSCH Occasion i=1, and RV #3 may be applied to PUSCH transmission in slot M corresponding to PUSCH Occasion i=2.

FIG. 11 is a diagram illustrating an example of PUSCH occasion and redundancy version mapping in a multi-slot PUSCH transmission (TBoMS) composed of multi-code blocks and one TB allocated with time domain resources like PUSCH repetition type A.

With reference to FIG. 11, the multi-slot PUSCH transmission (TBoMS) composed of three multi-code blocks 1103 configured through higher layer signaling and L1 signaling and one TB allocated with time domain resources like the PUSCH repetition type A may be allocated to consecutive physical slots and transmitted (1101) or may be allocated to nonconsecutive physical slots and transmitted (1102).

The PUSCH occasion and redundancy version mapping method of TBoMS PUSCH allocated to consecutive physical slots may be determined using one or any combination of the method 2-1, the method 2-2, and the method 2-3. That is, in FIG. 11, the above-described method 2-1 may be applied in case of a PUSCH occasion and redundancy version mapping method 1104 for each of TBoMS multiple slots, the above-described method 2-2 may be applied in case of a method 1105 of mapping the same PUSCH occasion and redundancy version to the TBoMS multiple slots, and the above-described method 2-3 may be applied in case of a PUSCH occasion and redundancy version mapping method 1106 for the TBoMS multiple slots based on an arbitrary variable. If the PUSCH occasion and redundancy version mapping are configured for the TBoMS multiple slots through the above method, all multi-code blocks may be allocated to resources based on the PUSCH occasion and the redundancy version.

In this case, the UE may divide the resources by the number of multi-code blocks to map all the code blocks. In Case 1 (1105) of FIG. 11, three multi-code blocks 1103 may be mapped to TBoMS composed of four multiple slots. When TBoMS is configured with higher layer signaling and L1 signaling, and when the number of multiple slots of TBoMS K=4 and the symbol length L=9 are configured, each code block may be rate-matching for 12 symbols by means of the symbol length $$LRM = \left\lceil \frac{L \times K}{\text{The number of } CodeBlock} \right\rceil$$

of the resource to which one code block is mapped.

The PUSCH occasion and redundancy version mapping method 1102 of the TBoMS PUSCH allocated to the nonconsecutive physical slots may be applied equally as the above-described method 1002 in which the multi-slot PUSCH transmission (TBoMS) composed of a single code block configured through higher layer signaling and L1 signaling and one TB allocated with time domain resources like the PUSCH repetition type A is allocated to nonconsecutive physical slots and transmitted. Thereafter, the multi-code blocks 1103 may be mapped based on the configured PUSCH occasion and redundancy version. Referring to Case 3 in FIG. 11, when Slot 0 is configured as (PUSCH occasion i=0, redundancy version=0), Slot N and Slot N+1 are configured as (PUSCH occasion i=1, redundancy version=2), and Slot M is configured as (PUSCH occasion i=2, redundancy version=3) in the nonconsecutive physical slots of TBoMS, three multi-code blocks may be mapped to the same PUSCH occasion according to the redundancy version.

In addition, in two consecutive slots Slot N and Slot N+1, each code block may be rate-matching for 6 symbols by means of the symbol length $$LRM = \left\lceil \frac{L \times K}{\text{The number of } CodeBlock} \right\rceil$$

of the resource to which one code block is mapped using the number of consecutive multiple slots K=2 and the symbol length L=9.

Third Embodiment

The third embodiment of the disclosure provides a method for configuring a PUSCH occasion and redundancy version pattern for a TBoMS PUSCH when multi-slot PUSCH transmission composed of one TB (TBoMS) is configured as the PUSCH repetition type B.

When the multi-slot PUSCH transmission composed of one TB (TBoMS) is configured from the base station through higher layer signaling and L1 signaling, the UE may allocate the PUSCH occasion and perform mapping of the redundancy version, based on the time-domain resource allocation type, whether to segment the code block or not, and the consecutive/nonconsecutive property of the transmitted multi-slot PUSCH.

Figure 12:
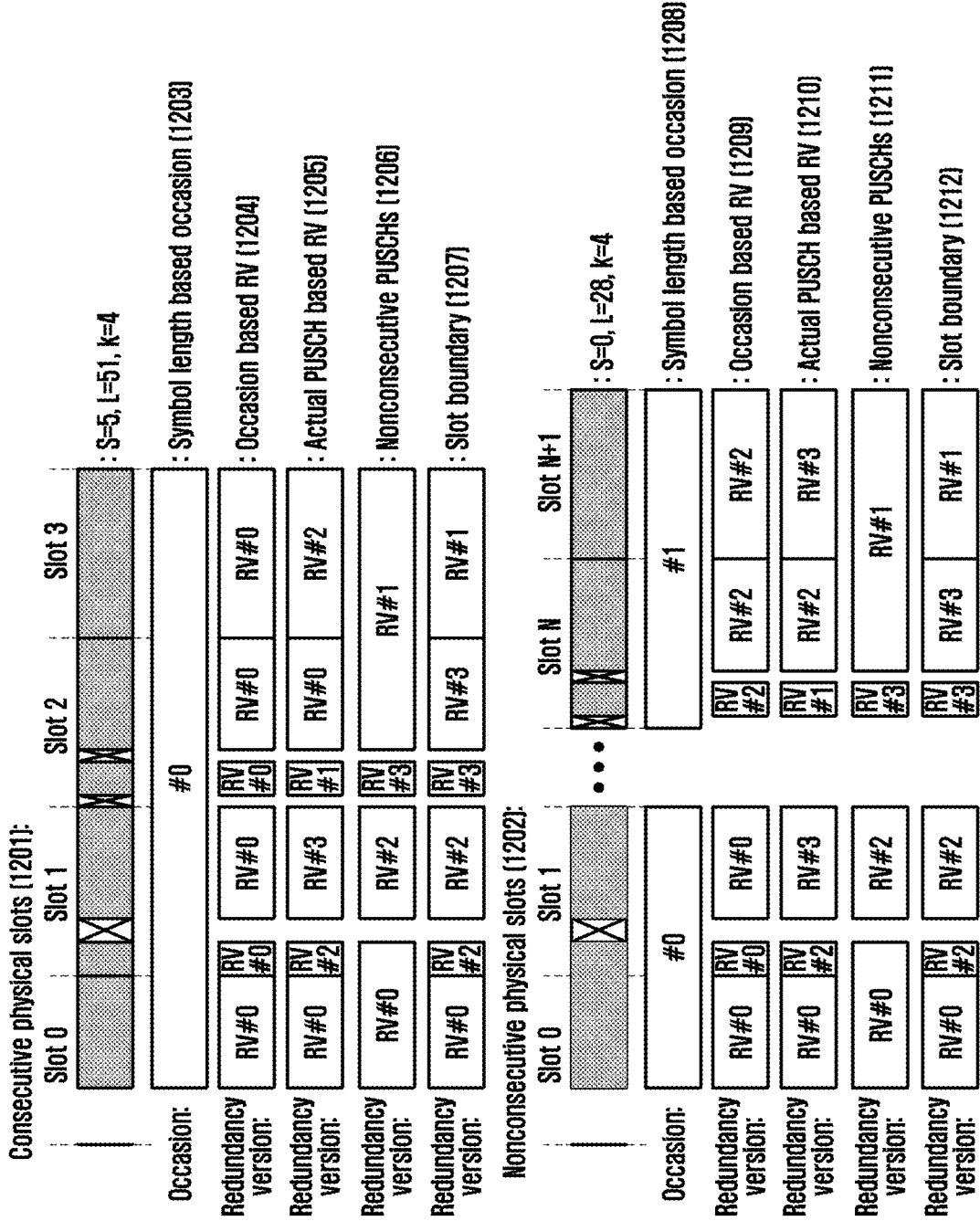
FIG. 12 is a diagram illustrating an example of PUSCH occasion and redundancy version mapping in a multi-slot PUSCH transmission (TBoMS) composed of a single code block and one TB allocated with time domain resources like PUSCH repetition type B according to embodiments of the present disclosure.

FIG. 12 is a diagram illustrating an example of a single code block and PUSCH occasion and redundancy version mapping in a multi-slot PUSCH transmission composed of one TB (TBoMS) allocated with time domain resources like PUSCH repetition type B according to embodiments of the present disclosure.

With reference to FIG. 12, the multi-slot PUSCH transmission (TBoMS) composed of a single code block configured through higher layer signaling and L1 signaling and one TB allocated with time domain resources like the PUSCH repetition type B may be allocated to consecutive physical slots and transmitted (1201). If the TBoMS is configured with a start symbol S=5, a symbol length L=51, and the number of multiple slots k=4 through higher layer signaling and L1 signaling, the same PUSCH occasion i may be allocated based on the symbol length L (1203). A redundancy version mapping method for TBoMS to which time domain resources are allocated like the configured PUSCH repetition type B may be determined using one or any combination of the following methods.

[Method 3-1]

In the method 3-1, if multi-slot PUSCH transmission composed of one TB (TBoMS) allocated with time domain resources like the PUSCH repetition type B is configured with higher layer signaling and L1 signaling, PUSCH may be transmitted for valid symbols except for invalid symbols. In this case, when the redundancy version is mapped based on the configured PUSCH occasion, actual PUSCHs may be transmitted while being separated by slot boundaries and invalid symbols for TBoMS having a symbol length L=51, and the same PUSCH occasion i=0 and redundancy version=0 may be configured for each of the actual PUSCHs (1204).

[Method 3-2]

In the method 3-2, when the multi-slot PUSCH transmission composed of one TB (TBoMS) allocated with time domain resources like the PUSCH repetition type B is configured with higher layer signaling and L1 signaling, and when the redundancy version pattern is configured to {0, 2, 3, 1} through higher layer signaling, PUSCH may be transmitted for valid symbols except for invalid symbols. In this case, when the redundancy version is mapped based on the configured PUSCH occasion, PUSCHs may be transmitted actually while being separated by slot boundaries and invalid symbols for TBoMS having a symbol length L=51, the same PUSCH occasion i=0 is configured for each of the actual PUSCHs, and the redundancy version of the PUSCH transmission may be configured by applying the redundancy version of the first actual PUSCH transmission to the redundancy version pattern with n=modulo(y, 4) based on the PUSCH transmission order y (1205).

[Method 3-3]

In the method 3-3, when the multi-slot PUSCH transmission composed of one TB (TBoMS) allocated with time domain resources like the PUSCH repetition type B is configured with higher layer signaling and L1 signaling, and when the redundancy version pattern is configured to {0, 2, 3, 1} through higher layer signaling, PUSCH may be transmitted for valid symbols except for invalid symbols. In this case, when the redundancy version is mapped based on the configured PUSCH occasion, actual PUSCHs may be transmitted while being separated by slot boundaries and invalid symbols for TBoMS having a symbol length L=51, the same PUSCH occasion i=0 is configured for each of the actual PUSCHs, and the redundancy version of the PUSCH transmission may be configured by mapping the redundancy version of the PUSCH transmission of consecutive symbols to the same redundancy version and applying the next redundancy version pattern to the nonconsecutive PUSCH transmission due to invalid symbols (1206).

[Method 3-4]

In the method 3-4, when the multi-slot PUSCH transmission composed of one TB (TBoMS) allocated with time domain resources like the PUSCH repetition type B is configured with higher layer signaling and L1 signaling, and when the redundancy version pattern is configured to {0, 2, 3, 1} through higher layer signaling, PUSCH may be transmitted for valid symbols except for invalid symbols. In this case, when the redundancy version is mapped based on the configured PUSCH occasion, actual PUSCHs may be transmitted while being separated by slot boundaries and invalid symbols for TBoMS having a symbol length L=51, the same PUSCH occasion i=0 is configured for each of the actual PUSCHs, and the redundancy version of the PUSCH transmission may be configured by mapping the redundancy version of the PUSCH transmission of the same slot to the same redundancy version and applying the next redundancy version pattern according to the slot boundary (1207).

With one or any combination of the above methods, the redundancy version may be configured for TBoMS to which time domain resources are allocated like the PUSCH repetition type B.

With reference to FIG. 12, a single code block configured through higher layer signaling and L1 signaling and the multi-slot PUSCH transmission composed of one TB (TBoMS) allocated with time domain resources like the PUSCH repetition type B may be allocated to nonconsecutive physical slots and transmitted (1202). If the TBoMS is configured to a start symbol S=0, a symbol length L=28, and the number of multiple slots k=4 through higher layer signaling and L1 signaling, the PUSCH occasion i=0 of the PUSCH allocated to Slot 0 and Slot 1 and the PUSCH occasion i=1 of the PUSCH allocated to Slot N and Slot N+1 may be configured respectively based on the symbol length L (1208).

A redundancy version mapping method for TBoMS to which time domain resources are allocated like the configured PUSCH repetition type B may be determined using one or any combination of the above methods (e.g., the method 3-1 to the method 3-4). For example, RV #0 may be applied to PUSCH transmission corresponding to PUSCH occasion i=0, and RV #2 may be applied to PUSCH transmission corresponding to PUSCH occasion i=1 (1208). Alternatively, the redundancy version pattern may be determined with n=modulo(y, 4) based on the actual PUSCH transmission order y (1209). Alternatively, depending on whether symbols for PUSCH transmission are consecutive, the same redundancy version may be mapped to PUSCH transmission of consecutive symbols and the following redundancy version pattern may be applied to non-consecutive PUSCH transmission due to invalid symbols (1211). Alternatively, when a slot is changed according to a slot boundary, the redundancy version may be changed (1212).

Figure 13:
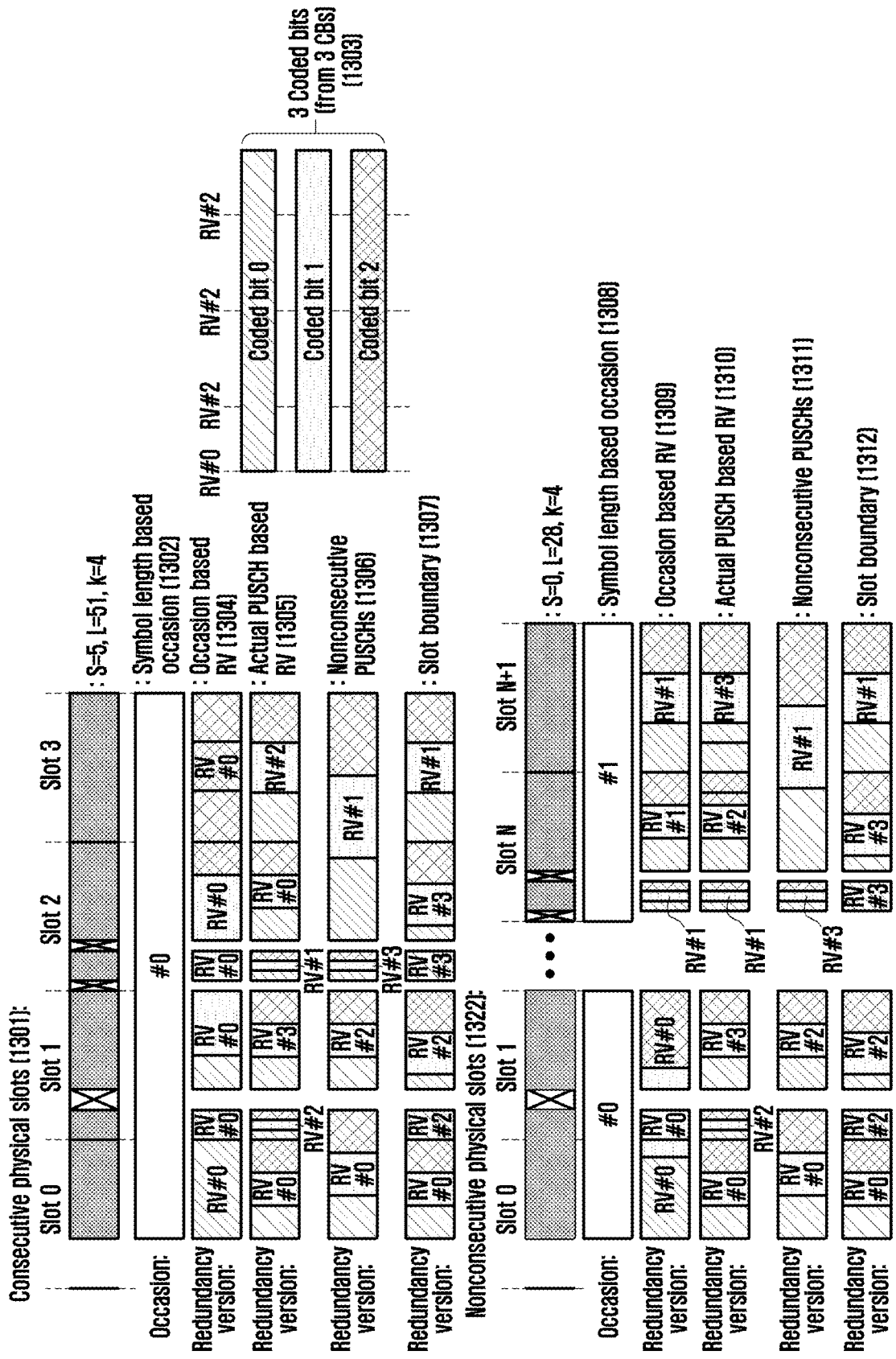
FIG. 13 is a diagram illustrating an example of PUSCH occasion and redundancy version mapping in a multi-slot PUSCH transmission (TBoMS) composed of multi-code blocks and one TB allocated with time domain resources like PUSCH repetition type B according to embodiments of the present disclosure.

FIG. 13 is a diagram illustrating an example of PUSCH occasion and redundancy version mapping in a multi-slot PUSCH transmission (TBoMS) composed of multi-code blocks and one TB allocated with time domain resources like PUSCH repetition type B according to embodiments of the present disclosure.

With reference to FIG. 13, the multi-slot PUSCH transmission (TboMS) composed of multi-code blocks configured through higher layer signaling and L1 signaling and one TB allocated with time domain resources like the PUSCH repetition type B may be allocated to consecutive physical slots and transmitted (1301). If the TboMS is configured with a start symbol S=5, a symbol length L=51, and the number of multiple slots k=4 through higher layer signaling and L1 signaling, the same PUSCH occasion i (e.g., i=0) may be allocated based on the symbol length L (1302). A redundancy version mapping method for TboMS to which time domain resources are allocated like the configured PUSCH repetition type B may be determined using one or any combination of the following methods.

[Method 3-5]

In the method 3-5, if multi-slot PUSCH transmission composed of one TB (TboMS) allocated with time domain resources like the PUSCH repetition type B is configured with higher layer signaling and L1 signaling, PUSCH may be transmitted for valid symbols except for invalid symbols. In this case, when the redundancy version is mapped based on the configured PUSCH occasion, actual PUSCHs may be transmitted while being separated by slot boundaries and invalid symbols for TboMS having a symbol length L=51, and the same PUSCH occasion i=0 and redundancy version=0 may be configured for each of the actual PUSCHs (1304). In this case, all multi-code blocks may be rate-matching for all valid symbols configured with the same redundancy version=0. Also, the symbol length $$LRM = \left\lceil \frac{L}{\text{The number of } CodeBlock} \right\rceil$$

of the resource to which one code block is mapped may be determined based on the length L of all valid PUSCH symbols having the same redundancy version as the number of configured multi-code blocks (1304).

[Method 3-6]

In the method 3-6, when the multi-slot PUSCH transmission (TboMS) composed of one TB allocated with time domain resources like the PUSCH repetition type B is configured with higher layer signaling and L1 signaling, and when the redundancy version pattern is configured to {0, 2, 3, 1} through higher layer signaling or L1 signaling, PUSCH may be transmitted for valid symbols except for invalid symbols. In this case, when the redundancy version is mapped based on the configured PUSCH occasion, actual PUSCHs may be transmitted while being separated by slot boundaries and invalid symbols for TboMS having a symbol length L=51, the same PUSCH occasion i=0 is configured for each of the actual PUSCHs, and the redundancy version of the PUSCH transmission may be configured by applying the redundancy version of the first actual PUSCH transmission to the redundancy version pattern with n=modulo(y, 4) based on the PUSCH transmission order y (1305).

In this case, all multi-code blocks may be rate-matching for all valid symbols configured with the same redundancy version. Also, the symbol length $$LRM = \left\lceil \frac{L}{\text{The number of } CodeBlock} \right\rceil$$

of the resource to which one code block is mapped may be determined based on the length L of all valid PUSCH symbols having the same redundancy version as the number of configured multi-code blocks (1305).

[Method 3-7]

In the method 3-7, when the multi-slot PUSCH transmission (TBoMS) composed of one TB allocated with time domain resources like the PUSCH repetition type B is configured with higher layer signaling and L1 signaling, and when the redundancy version pattern is configured to {0, 2, 3, 1} through higher layer signaling or L1 signaling, PUSCH may be transmitted for valid symbols except for invalid symbols. In this case, when the redundancy version is mapped based on the configured PUSCH occasion, actual PUSCHs may be transmitted while being separated by slot boundaries and invalid symbols for TBoMS having a symbol length L=51, the same PUSCH occasion i=0 is configured for each of the actual PUSCHs, and the redundancy version of the PUSCH transmission may be configured by mapping the redundancy version of the PUSCH transmission of consecutive symbols to the same redundancy version and applying the next redundancy version pattern to the nonconsecutive PUSCH transmission due to invalid symbols (1306).

In this case, all multi-code blocks may be rate-matching for all valid symbols configured with the same redundancy version. Also, the symbol length $$LRM = \left\lceil \frac{L}{\text{The number of } CodeBlock} \right\rceil$$

of the resource to which one code block is mapped may be determined based on the length L of all valid PUSCH symbols having the same redundancy version as the number of configured multi-code blocks (1306).

[Method 3-8]

In the method 3-8, when the multi-slot PUSCH transmission composed of one TB (TBoMS) allocated with time domain resources like the PUSCH repetition type B is configured with higher layer signaling and L1 signaling, and when the redundancy version pattern is configured to {0, 2, 3, 1} through higher layer signaling or L1 signaling, PUSCH may be transmitted for valid symbols except for invalid symbols. In this case, when the redundancy version is mapped based on the configured PUSCH occasion, actual PUSCHs may be transmitted while being separated by slot boundaries and invalid symbols for TBoMS having a symbol length L=51, the same PUSCH occasion i=0 is configured for each of the actual PUSCHs, and the redundancy version of the PUSCH transmission may be configured by mapping the redundancy version of the PUSCH transmission of the same slot to the same redundancy version and applying the next redundancy version pattern according to the slot boundary (1307).

In this case, all multi-code blocks may be rate-matching for all valid symbols configured with the same redundancy version. Also, the symbol length $$LRM = \left\lceil \frac{L}{\text{The number of } CodeBlock} \right\rceil$$

of the resource to which one code block is mapped may be determined based on the length L of all valid PUSCH symbols having the same redundancy version as the number of configured multi-code blocks (1307).

With one or any combination of the above methods, the redundancy version may be configured for TBoMS to which time domain resources are allocated like the PUSCH repetition type B.

With reference to FIG. 13, the multi-slot PUSCH transmission (TBoMS) composed of a single code block configured through higher layer signaling and L1 signaling and one TB allocated with time domain resources like the PUSCH repetition type B may be allocated to nonconsecutive physical slots and transmitted (1322). If the TBoMS is configured to a start symbol S=0, a symbol length L=28, and the number of multiple slots k=4 through higher layer signaling and L1 signaling, the PUSCH occasion i=0 of the PUSCH allocated to Slot 0 and Slot 1 and the PUSCH occasion i=1 of the PUSCH allocated to Slot N and Slot N+1 may be configured based on the symbol length L (1308). A redundancy version mapping method for TBoMS to which time domain resources are allocated like the configured PUSCH repetition type B may be determined using one or any combination of the above methods (e.g., the method 3-5 to the method 3-8).

Figure 14:
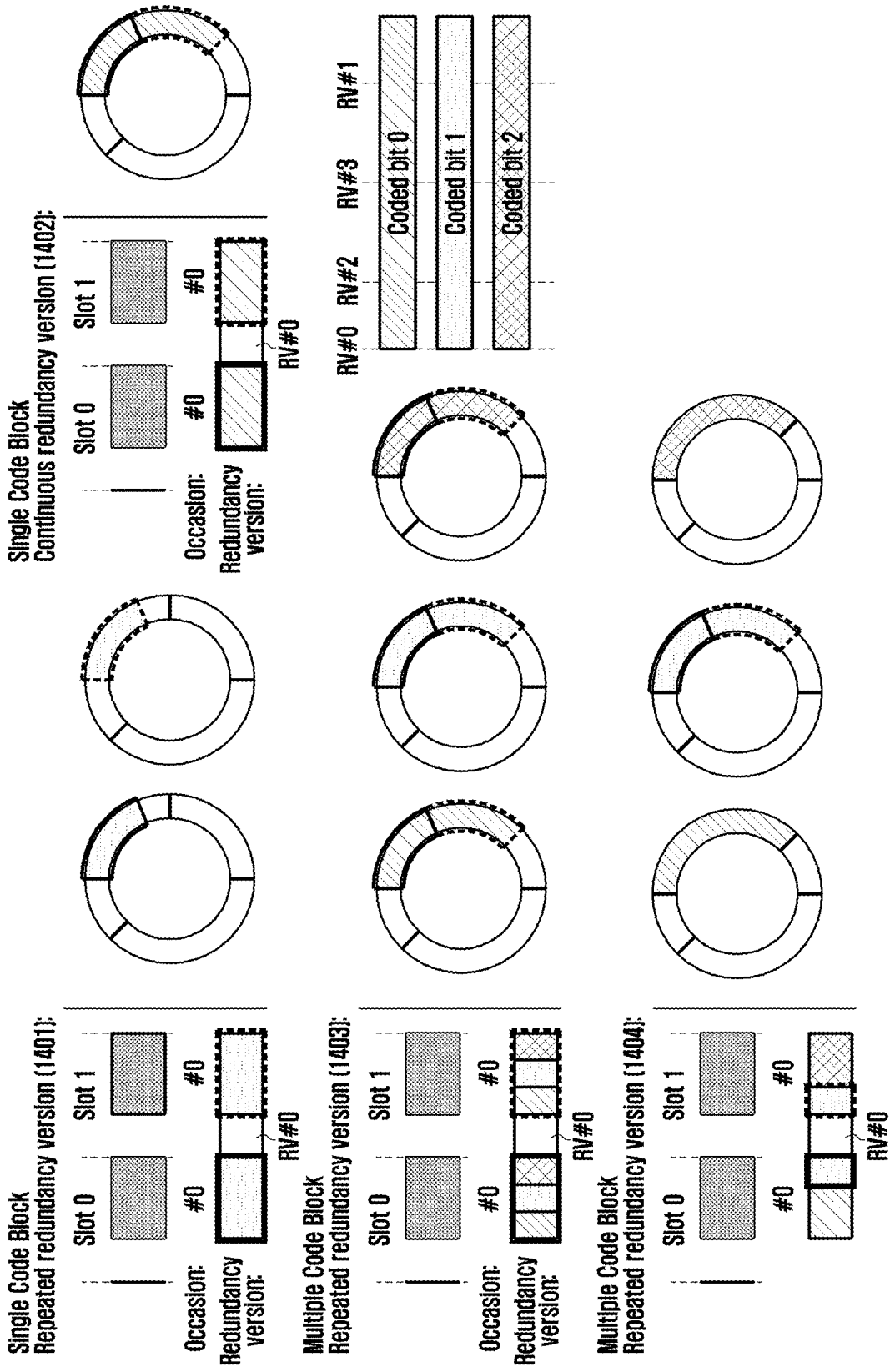
FIG. 14 is a diagram illustrating an example of a method for configuring a code block in multi-slot PUSCH transmission (TBoMS) composed of one TB according to an embodiment of the present disclosure.

FIG. 14 is a diagram illustrating an example of a method for configuring a code block in multi-slot PUSCH transmission composed of one TB (TBoMS) according to an embodiment of the present disclosure.

With reference to FIG. 14, a method for mapping a code block to multi-slot PUSCH transmission (TBoMS) composed of one TB is presented. Hereinafter, in describing an embodiment of the disclosure, the TBoMS with time domain resources allocated like the PUSCH repetition type A will be described as an example, but this is only for illustration and does not limit the scope of the disclosure. The embodiment of the disclosure may also be applied to the TBoMS with time domain resources allocated like the PUSCH repetition type B.

When the multi-slot PUSCH transmission (TBoMS) composed of a single code block and one TB is configured from the base station to the UE through higher layer signaling and L1 signaling, a method 1401 for repeatedly rate-matching a single code block to the TBoMS of the same redundancy version or a method 1402 for continuously rate-matching may be applied. For example, according to the method 1401 for repeatedly rate-matching of a single code block to the TBoMS of the same redundancy version, a starting position of rate-matching for a code block of slot 0 and a starting position of rate-matching for a code block of slot 1 may be the same. For example, according to the method 1402 for continuously rate-matching of the single code block to the TBoMS of the same redundancy version, the starting position of rate-matching for the code block in slot 1 may be located consecutively from an ending position of rate-matching for the code block in slot 0. The repeated rate matching method 1401 based on the same redundancy version can improve the reliability of transmitted information, and the continuous rate matching method 1402 based on the same redundancy version can transmit more channel-coded bits to obtain a channel coding gain.

When the multi-slot PUSCH transmission (TBoMS) composed of multiple code blocks and one TB is configured from the base station to the UE through higher layer signaling and L1 signaling, a method 1403 for repeatedly continuous rate-matching the multiple code blocks to the TBoMS of the same redundancy version or a method 1404 for continuously rate-matching the multiple code blocks to all PUSCH resources of the configured TBoMS may be applied. For example, according to the method 1403 for repeatedly continuous rate-matching multiple code blocks to TBoMS of the same redundancy version, a starting position of rate-matching for code block 0 of slot 1 is may be located consecutively from an ending position of rate-matching for a code block 0 of slot 0. In addition, starting positions of rate-matching for code block 1 and code block 2 in each of slot 0 and slot 1 may be the same as the starting position of rate-matching for code block 0, respectively. For example, according to the method 1404 for continuously rate-matching the multiple code blocks to all PUSCH resources of the configured TBoMS, rate-matching may be performed for code block 1 corresponding to physically non-consecutive PUSCH resources, a starting position of rate-matching for code block 1 of slot 1 may be located continuously after an ending position of rate-matching for code block 1 of slot 0. The repeated rate matching method 1403 can receive all code blocks in the first Slot 0 and thereby perform self-decoding quickly. On the other hand, the continuous rate matching method 1404 of multi-code blocks for total PUSCH resources of the configured TBoMS can reduce the complexity of the UE by continuously rate-matching the physically nonconsecutive PUSCH resources only to the second code block. For rate-matching the multi-code blocks to the TboMS, the rate matching may be performed by repeating all the multi-code blocks as in the method 1401 for repeatedly rate-matching the single code block to TBoMS of the same redundancy version.

Fourth Embodiment

Figure 15:
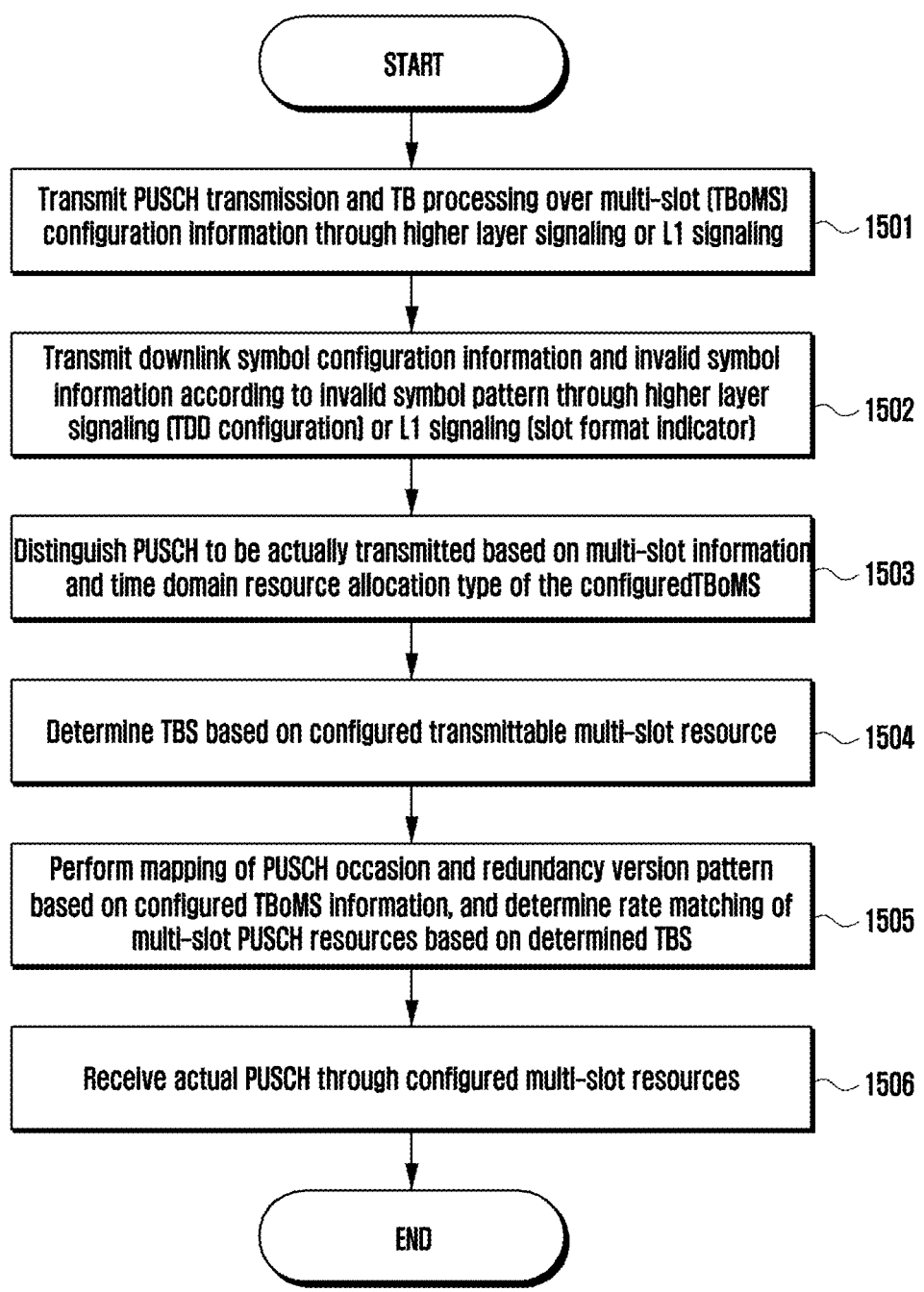
FIG. 15 is a flow diagram illustrating an operation of a base station for determining a TBS for multi-slot PUSCH transmission composed of one TB and controlling a PUSCH occasion and a redundancy version according to an embodiment of the present disclosure.

FIG. 15 is a flow diagram illustrating an operation of a base station for determining a TBS for multi-slot PUSCH transmission composed of one TB and controlling a PUSCH occasion and a redundancy version according to an embodiment of the present disclosure.

At step 1501, the base station may transmit PUSCH transmission and TB processing over multi-slot (TBoMS) configuration information to the UE through higher layer signaling or L1 signaling. Thereafter, at step 1502, the base station may transmit downlink symbol configuration information and invalid symbol information according to an invalid symbol pattern to the UE through higher layer signaling (e.g., TDD configuration) or L1 signaling (e.g., slot format indicator). In addition, at step 1503, the base station may distinguish PUSCH to be actually transmitted from the UE based on the configured time domain PUSCH resources, the multi-slot information of the TBoMS, and the time domain resource allocation type. Thereafter, at step 1504, the base station may determine a TBS based on the configured transmittable multi-slot resource. Then, at step 1505, the base station may perform mapping of a PUSCH occasion and redundancy version pattern based on the configured TBoMS information, and determine rate matching of multi-slot PUSCH resources based on the determined TBS. Thereafter, at step 1506, the base station may actually receive the PUSCH through the configured multi-slot resources.

Figure 16:
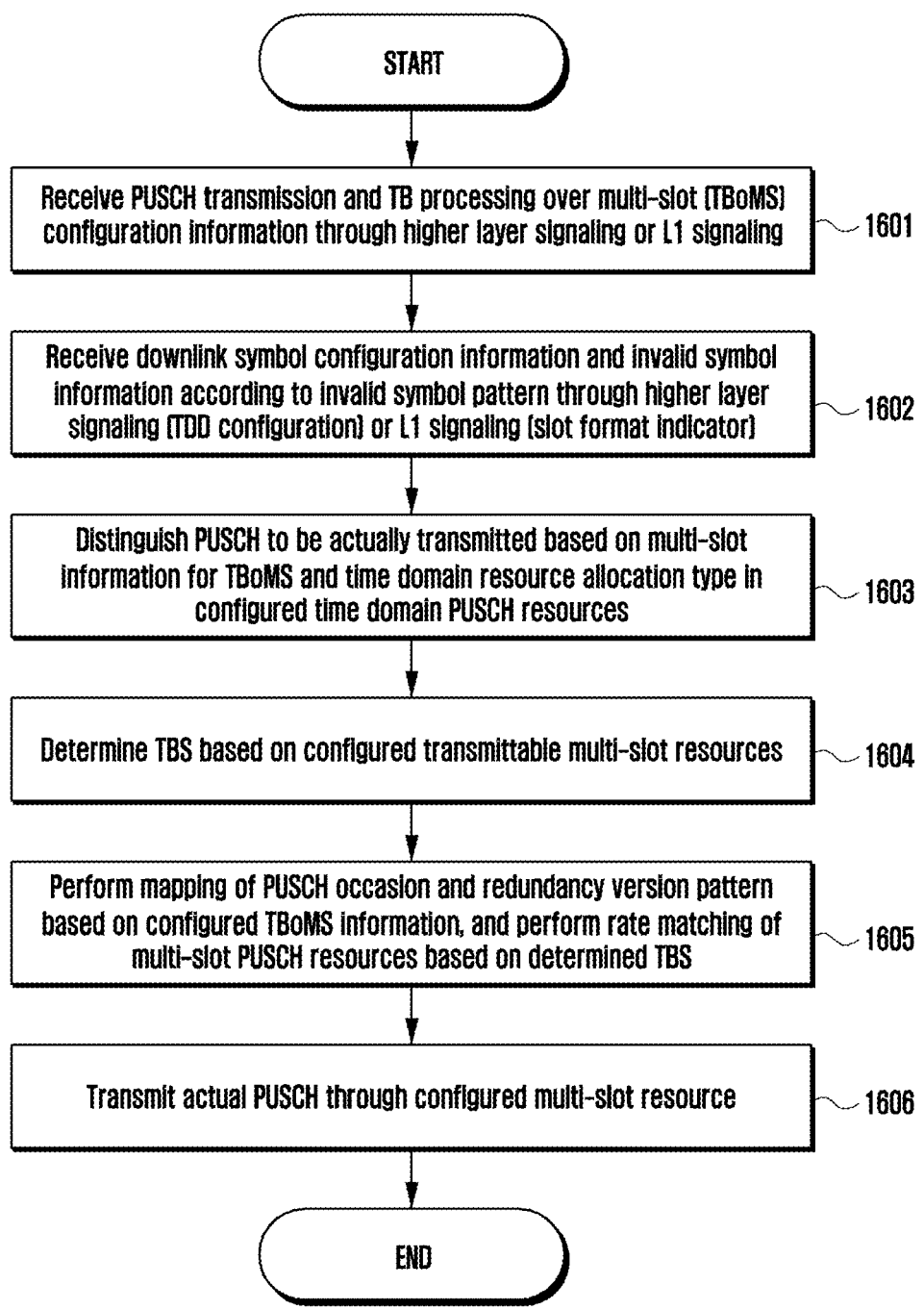
FIG. 16 is a flow diagram illustrating an operation of a UE for determining a TBS for multi-slot PUSCH transmission composed of one TB and mapping and transmitting a PUSCH occasion and a redundancy version according to an embodiment of the present disclosure.

FIG. 16 is a flow diagram illustrating an operation of a UE for determining a TBS for multi-slot PUSCH transmission composed of one TB and mapping and transmitting a PUSCH occasion and a redundancy version according to an embodiment of the present disclosure.

At step 1601, the UE may receive PUSCH transmission and TB processing over multi-slot (TBoMS) configuration information through higher layer signaling or L1 signaling. Thereafter, at step 1602, the UE may receive downlink symbol configuration information and invalid symbol information according to an invalid symbol pattern through higher layer signaling (e.g., TDD configuration) or L1 signaling (e.g., slot format indicator). At step 1603, the UE may distinguish PUSCH to be actually transmitted based on the multi-slot information for TBoMS and the time domain resource allocation type in the configured time domain PUSCH resources. Thereafter, at step 1604, the UE may determine a TBS based on the configured transmittable multi-slot resources. Then, at step 1605, the UE may perform mapping of a PUSCH occasion and redundancy version pattern based on the configured TBoMS information, and perform rate matching to multi-slot PUSCH resources based on the determined TBS. Thereafter, at step 1606, the UE may transmit the actual PUSCH through the configured multi-slot resource.

Figure 17:
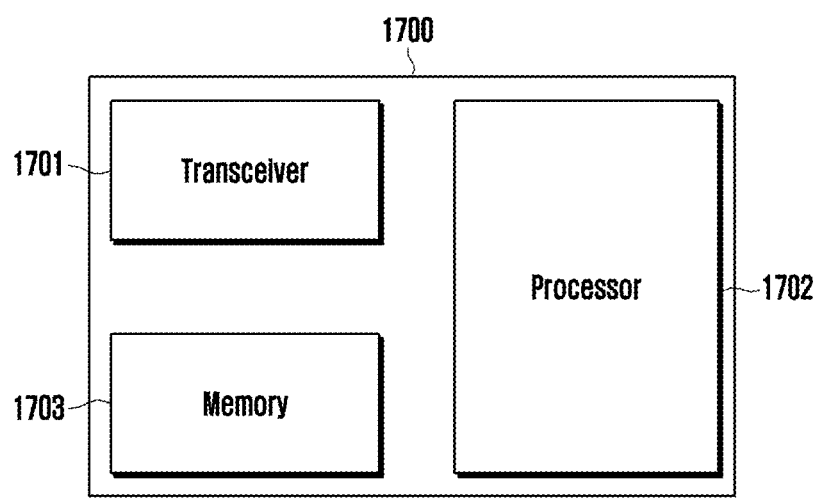
FIG. 17 illustrates a block diagram of a terminal according to an embodiment of the present disclosure.

FIG. 17 is a block diagram of a terminal according to an embodiment of the present disclosure.

Referring to FIG. 17, a terminal 1700 may include a transceiver 1701, a controller (processor) 1702, and a storage unit (memory) 1703. According to an efficient channel and signal transmission or reception method for a 5G communication system corresponding to the above embodiments, the transceiver 1701, the controller 1702, and the storage unit 1703 of the terminal 1700 may be operated. However, the elements of the terminal 1700 according to an embodiment are not limited to the above example. According to another embodiment, the terminal 1700 may also include more or fewer elements than the above elements. In addition, in a particular case, the transceiver 1701, the controller 1702, and the storage unit 1703 may be implemented in a single chip type.

The transceiver 1701 may also be configured by a transmitter and a receiver according to another embodiment. The transceiver 1701 may transmit or receive a signal to or from a base station. The signal may include control information and data. To this end, the transceiver 1701 may include an RF transmitter that up-converts and amplifies a frequency of a transmitted signal, an RF receiver that low-noise amplifies a received signal and down-converts the frequency, and the like. In addition, the transceiver 1701 may receive a signal through a wireless channel and output the signal to the controller 1702, and may transmit a signal output from the controller 1702, through a wireless channel.

The controller 1702 may control a series of processes allowing the terminal 1700 to be operated according to an embodiment of the disclosure described above. For example, the controller 1702 may determine a TBS to transmit one transport block in a PUSCH over multiple slots, and may perform PUSCH occasion and redundancy version mapping, according to an embodiment of the present disclosure. To this end, the controller 1702 may include at least one processor. For example, the controller 1702 may include a communication processor (CP) performing a control for communication, and an application processor (AP) controlling a higher layer, such as an application program.

The storage unit 1703 may store control information or data included in a signal obtained by the terminal 1700, and may have a region for storing data required for control of the controller 1702, and data generated when the controller 1702 performs control.

Figure 18:
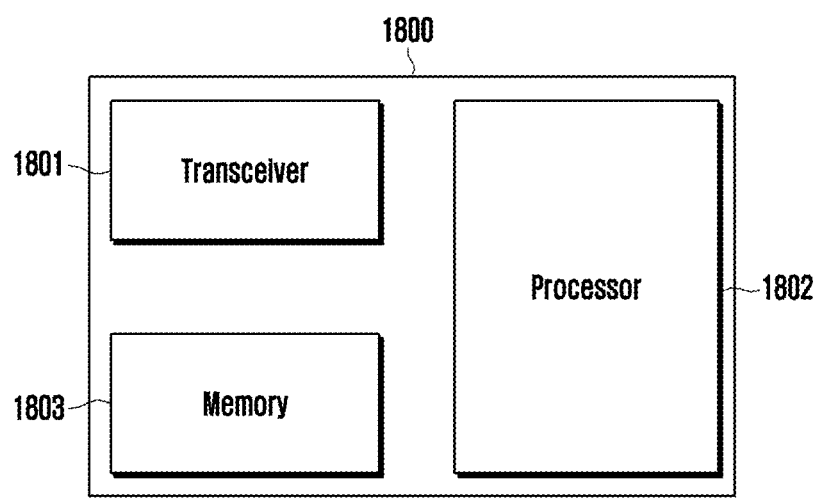
FIG. 18 illustrates a block diagram of a base station according to an embodiment of the present disclosure.

FIG. 18 is a block diagram of a base station according to an embodiment of the present disclosure.

Referring to FIG. 18, a base station 1800 may include a transceiver 1801, a controller (processor) 1802, and a storage unit (memory) 1803. According to an efficient channel and signal transmission or reception method for a 5G communication system corresponding to the above embodiments, the transceiver 1801, the controller 1802, and the storage unit 1803 of the base station 1800 may be operated. However, the elements of the base station 1800 according to an embodiment are not limited to the above example. According to another embodiment, base station 1800 may also include more or fewer elements than the above elements. In addition, in a particular case, the transceiver 1801, the controller 1802, and the storage unit 1803 may be implemented in a single chip type.

The transceiver 1801 may also be configured by a transmitter and a receiver according to another embodiment. The transceiver 1801 may transmit or receive a signal to or from a terminal. The signal may include control information and data. To this end, the transceiver 1801 may include an RF transmitter that up-converts and amplifies a frequency of a transmitted signal, an RF receiver that low-noise amplifies a received signal and down-converts the frequency, and the like. In addition, the transceiver 1801 may receive a signal through a wireless channel and output the signal to the controller 1802, and may transmit a signal output from the controller 1802, through a wireless channel.

The controller 1802 may control a series of processes so that the base station 1800 can operate according to an embodiment of the disclosure described above. For example, the controller 1802 may determine a TBS to receive one transport block transmitted through a PUSCH over multiple slots, and identify the PUSCH occasion and redundancy version mapping, according to an embodiment of the present disclosure. To this end, the controller 1802 may include at least one processor. For example, the controller 1802 may include a communication processor (CP) performing a control for communication, and an application processor (AP) controlling a higher layer, such as an application program.

The storage unit 1803 may store control information or data determined by the base station 1800, or control information or data received from a terminal, and may have a region for storing data required for control of the controller 1802, and data generated when the controller 1802 performs control.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving information indicating a number of slots for a transport block (TB) processing over multi-slot (TBoMS);
   determining multiple slots for a physical uplink shared channel (PUSCH) of the TBoMS, based on the information;
   identifying a redundancy version for the PUSCH of the TBoMS;
   performing rate matching of code blocks associated with the TBoMS; and
   transmitting the PUSCH of the TBoMS, based on the multiple slots,
   wherein a value of the redundancy version is applied on the TBOMS, and
   wherein rate matching of a code block for a second slot among the multiple slots starts consecutively from an end of rate matching of a code block for a first slot among the multiple slots.

2. The method of claim 1, wherein:
   the multiple slots comprise at least one of consecutive slots or nonconsecutive slots, and
   transmission occasions corresponding to the consecutive slots are determined to be the same for applying the value of the redundancy version to the TBoMS.

3. The method of claim 1, further comprising:
   identifying a configuration for a PUSCH repetition type, wherein the redundancy version is identified based on the configuration.

4. The method of claim 1, further comprising:
   determining a size of the TBoMS based on the number of the slots.

5. A method performed by a base station in a wireless communication system, the method comprising:
   transmitting, to a terminal, information indicating a number of slots for a transport block (TB) processing over multi-slot (TBoMS); and
   receiving, from the terminal, a physical uplink shared channel (PUSCH) of the TBoMS, based on multiple slots,
   wherein a value of a redundancy version for the PUSCH of the TBoMS is applied on the TBOMS,
   wherein the multiple slots are determined based on the information,
   wherein code blocks associated with the TBoMS are rate matched, and
   wherein rate matching of a code block for a second slot among the multiple slots starts consecutively from an end of rate matching of a code block for a first slot among the multiple slots.

6. The method of claim 5, further comprising:
   wherein a size of the TBoMS is determined based on the number of the slots.

7. The method of claim 5, wherein:
   the multiple slots comprise at least one of consecutive slots or nonconsecutive slots; and
   transmission occasions corresponding to the consecutive slots are determined to be the same for applying the value of the redundancy version to the TBoMS.

8. The method of claim 5, further comprising:
   transmitting, to the terminal, a configuration for a PUSCH repetition type,
   wherein the redundancy version is identified based on the configuration.

9. A terminal in a wireless communication system, the terminal comprising:
   a transceiver; and
   a processor operably coupled with the transceiver, the processor configured to:
      receive information indicating a number of slots for a transport block (TB) processing over multi-slot (TBoMS),
      determine multiple slots for a physical uplink shared channel (PUSCH) of the TBoMS, based on the information,
      identify a redundancy version for the PUSCH of the TBoMS,
      perform rate matching of code blocks associated with the TBoMS, and
      transmit the PUSCH of the TBoMS based on the multiple slots,
   wherein a value of the redundancy version is applied on the TBOMS, and
   wherein rate matching of a code block for a second slot among the multiple slots starts consecutively from an end of rate matching of a code block for a first slot among the multiple slots.

10. The terminal of claim 9, wherein:
    the processor is further configured to:
       determine a size of the TBoMS based on the number of the slots.

11. The terminal of claim 9, wherein:
    the multiple slots comprise at least one of consecutive slots or nonconsecutive slots; and
    transmission occasions corresponding to the consecutive slots are determined to be the same for applying the value of the redundancy version to the TBoMS.

12. The terminal of claim 9, wherein:
    the processor is further configured to:
       identify a configuration for a PUSCH repetition type, and
    the redundancy version is identified based on the configuration.

13. A base station in a wireless communication system, the base station comprising:
   a transceiver; and
   a processor operably coupled with the transceiver, the processor configured to:
      control the transceiver to transmit, to a terminal, information indicating a number of slots for a transport block (TB) processing over multi-slot (TBoMS), and
      control the transceiver to receive, from the terminal, a physical uplink shared channel (PUSCH) of the TBoMS, based on multiple slots,
   wherein a value of a redundancy version for the PUSCH of the TBoMS is applied on the TBoMS,
   wherein the multiple slots are determined based on the information, wherein code blocks associated with the TBoMS are rate matched, and wherein rate matching of a code block for a second slot among the multiple slots starts consecutively from an end of rate matching of a code block for a first slot among the multiple slots.

14. The base station of claim 13, wherein:

the processor is further configured to:
  control the transceiver to transmit, to the terminal, a configuration for a PUSCH repetition type, a size of the TBoMS is determined based on the number of the slots; and the redundancy version is identified based on the configuration.

* * * * *